(12) United States Patent
Ge et al.

(10) Patent No.: US 11,533,596 B2
(45) Date of Patent: Dec. 20, 2022

(54) API PUBLISH METHOD AND APPARATUS

(71) Applicant: Huawei Technologies Co., Ltd., Shenzhen (CN)

(72) Inventors: Cuili Ge, Beijing (CN); Niranth Amogh, Bangalore (IN); Yanmei Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/308,414

(22) Filed: May 5, 2021

(65) Prior Publication Data

US 2021/0258753 A1     Aug. 19, 2021

Related U.S. Application Data

(63) Continuation of application No. PCT/CN2019/099041, filed on Aug. 2, 2019.

(30) Foreign Application Priority Data

Nov. 5, 2018 (CN) .......................... 201811309187.8
Jan. 14, 2019 (CN) .......................... 201910033213.7

(51) Int. Cl.
H04W 4/50 (2018.01)
H04W 4/40 (2018.01)

(52) U.S. Cl.
CPC .............. *H04W 4/50* (2018.02); *H04W 4/40* (2018.02)

(58) Field of Classification Search
CPC .................................. H04W 4/40; H04W 4/50
See application file for complete search history.

(56) References Cited

U.S. PATENT DOCUMENTS

2020/0089552 A1* 3/2020 Pattan ................. H04L 41/0866
2021/0037007 A1* 2/2021 Gupta ................ G06Q 30/0185

FOREIGN PATENT DOCUMENTS

| CN | 107969169 A | 4/2018 |
|----|-------------|--------|
| CN | 108353093 A | 7/2018 |
| EP | 3264727 A1  | 1/2018 |
| EP | 3281168 A1  | 2/2018 |

OTHER PUBLICATIONS

Huawei, et al., "API publish and API discover for CAPIF interconnection," 3GPP Draft; S6-181382—API Publish and API Discover for CAPIF Interconnection, 3rd Generation Partnership Project (3GPP), vol. SA WG6, no. Vilnius, Lithuania; Oct. 15-19, 2018, 4 pages.
Huawei, "API sharing for CCF interconnection," 3GPP TSG-SA WG6 Meeting #28, Kochi, India, Jan. 21-25, 2019, S6-190175, 4 pages.
Huawei, et al., "API publish and API discover for CAPIF interconnection," 3GPP TSG-SA WG6 Meeting #26, Vilnius, Lithuania, Oct. 15-19, 2018, S6-181559, 4 pages.

(Continued)

*Primary Examiner* — Jonathan A Bui
(74) *Attorney, Agent, or Firm* — Conley Rose, P.C.

(57) ABSTRACT

An application programming interface (API) method includes determining, by a first common API core function (CCF) entity, a to-be-shared API, and sharing, by the first CCF entity, information about the to-be-shared API with a target CCF entity of the to-be-shared API.

23 Claims, 7 Drawing Sheets

(56) References Cited

OTHER PUBLICATIONS

3GPP TR 23.722, V15.1.0, (Apr. 2018), "3rd Generation Partnership Project; Technical Specification Group Services and System Aspects; Study on Common API Framework for 3GPP Northbound APIs(Release 15)," 65 pages.

3GPP TS 23.222 V16.1.0, (Sep. 2018), "3rd Generation Partnership Project; Technical Specification Group Services and System Aspects; Functional architecture and information flows to support Common API Framework for 3GPP Northbound APIs; Stage 2 (Release 16)," 94 pages.

Huawei, et al., "Topology hiding enhancement," 3GPP TSG-SA WG6 Meeting #26, Vilnius, Lithuania, Oct. 15-19, 2018, S6-181585, 2 pages.

* cited by examiner

API PUBLISH METHOD AND APPARATUS

CROSS-REFERENCE TO RELATED APPLICATIONS

This application is a continuation of International Patent Application No. PCT/CN2019/099041 filed on Aug. 2, 2019, which claims priority to Chinese Patent Application No. 201811309187.8 filed on Nov. 5, 2018 and Chinese Patent Application No. 201910033213.7 filed on Jan. 14, 2019, all of which are hereby incorporated by reference in their entireties.

TECHNICAL FIELD

This application relates to the field of communications technologies, and in particular, to an application programming interface (API) publish method and an apparatus.

BACKGROUND

To better support a service, an operator may provide a network service or a network capability for an application in a form of an API. The 3rd Generation Partnership Project (3GPP) defines a common API framework (CAPIF), which is mainly used for API publication, discovery, and management. In this architecture, an application can conveniently and quickly use an API.

In the CAPIF system architecture, one or more common application programming interface core function (CCF) entities are supported, and interfaces of a plurality of CCF entities are defined. One CCF entity usually supports functions of publishing and performing authentication on an API in one region. Currently, an API is published to only one CCF entity when being published.

With development of new deployment scenarios and business models such as vehicle-to-everything (V2X) services, on one hand, users of a same V2X application may come from different public land mobile networks (PLMNs), and on the other hand, a service coverage of a same V2X application may cross PLMNs. In addition, in a same PLMN, one local application may further cross a plurality of regions. There is an increasingly high requirement for interconnection and interworking between different PLMNs and interconnection and interworking between a plurality of regions in a same PLMN. How to publish an API to a plurality of CCF entities is a problem that needs to be resolved.

SUMMARY

Embodiments of this application provide an API publish method, to publish an API to a plurality of CCF entities.

To achieve the foregoing objective, the following technical solutions are used in the embodiments of this application.

According to a first aspect, this application provides an API publish method and a communications apparatus.

The API publish method may include determining, by a first CCF entity, a to-be-shared API, and sharing, by the first CCF entity, information about the to-be-shared API with a target CCF entity of the to-be-shared API. In this method, the first CCF entity may share the API with another CCF entity, so that the API is published to a plurality of CCF entities. In this way, invocation of one API can be provided by using AEF entities respectively corresponding to a plurality of CCF entities, so that an API invoking entity can discover and obtain the API by using the plurality of CCF entities.

With reference to the first aspect, in a possible design, the first CCF entity receives a first API publish request, where the first API publish request includes information about an API and sharing information of the API, the first CCF entity determines the to-be-shared API based on the first API publish request, and the first CCF entity determines the target CCF entity based on the sharing information. In this method, a publish entity determines to share an API and a target CCF entity for sharing the API.

In a possible design, the sharing information includes at least one of sharing indication information, information about the target CCF entity, or target domain indication information, and the sharing indication information is used to indicate that the API is to be shared, the target domain indication information is used to indicate a target domain, and the target domain is different from a domain to which the first CCF entity belongs.

In a possible design, if the sharing information includes the sharing indication information, the first CCF entity determines the target CCF entity according to a first preset rule, or if the sharing information includes the information about the target CCF entity, the first CCF entity determines the target CCF entity based on the information about the target CCF entity, or if the sharing information includes the target domain indication information, the first CCF entity determines a second target CCF entity based on the target domain indication information, where the second target CCF entity is one or more CCF entities in the target CCF entity, and a domain to which the second target CCF entity belongs is different from the domain to which the first CCF entity belongs.

In a possible design, if the target domain indication information is an identifier of the target domain, the first CCF entity determines the second target CCF entity in the target domain according to a second preset rule, or if the target domain indication information includes an identifier of the target domain and inter-domain target CCF entity information, the first CCF entity determines the second target CCF entity in the target domain based on the inter-domain target CCF entity information.

In another possible design, the sharing information includes sharing range indication information, and the sharing range indication information is used to indicate a sharing range of the API. In this method, an API entity determines a range for sharing the API.

In a possible design, if the sharing range of the to-be-shared API is one or more CCF entities inside a domain to which the first CCF entity belongs, the first CCF entity determines the target CCF entity in the CCF entities inside the domain to which the first CCF entity belongs.

In another possible design, if the sharing range of the to-be-shared API is one or more CCF entities outside a domain to which the first CCF entity belongs, the first CCF entity determines the target CCF entity in the CCF entities outside the domain to which the first CCF entity belongs.

In another possible design, if the sharing range of the to-be-shared API includes one or more CCF entities inside a domain to which the first CCF entity belongs and one or more CCF entities outside the domain to which the first CCF entity belongs, the first CCF entity determines a first target CCF entity in the CCF entities inside the domain to which the first CCF entity belongs, and determines a second target CCF entity in the CCF entities outside the domain to which the first CCF entity belongs, where the target CCF entity includes the first target CCF entity and the second target CCF entity.

The first target CCF entity is one or more CCF entities in the target CCF entity, and a domain to which the first target CCF entity belongs is the same as the domain to which the first CCF entity belongs. The second target CCF entity is one or more CCF entities in the target CCF entity, and a domain to which the second target CCF entity belongs is different from the domain to which the first CCF entity belongs.

In a possible design, the sharing information further includes target domain indication information, and the target domain indication information is used to indicate a target domain to which the target CCF entity belongs. The determining, by the first CCF entity, the target CCF entity in the CCF entities outside the domain to which the first CCF entity belongs includes determining, by the first CCF entity, the target CCF entity in one or more CCF entities inside the target domain. The determining, by the first CCF entity, the second target CCF entity in the CCF entities outside the domain to which the first CCF entity belongs includes determining, by the first CCF entity, the second target CCF entity in one or more CCF entities inside the target domain.

With reference to the first aspect, in a possible design, the first CCF entity determines the to-be-shared API according to a third preset rule. Further, the first CCF entity determines the target CCF entity according to a fourth preset rule. In this implementation, a CCF entity determines to share an API and a target CCF entity for sharing the API.

In a possible implementation, the target CCF entity includes a first target CCF entity and/or a second target CCF entity, and a domain to which the first target CCF entity belongs is the same as the domain to which the first CCF entity belongs, and a domain to which the second target CCF entity belongs is different from the domain to which the first CCF entity belongs.

In a possible implementation, the first CCF entity shares the information about the to-be-shared API with the second target CCF entity, where the information about the to-be-shared API is global information. In this implementation, because the domain to which the second target CCF entity belongs is different from the domain to which the first CCF entity belongs, the global information is used, so that the second target CCF entity can identify the to-be-shared API.

In a possible implementation, the information about the to-be-shared API includes interface information of the to-be-shared API, and the interface information is information about a topology hiding entry point. In this implementation, topology hiding is performed on interface information between different domains, and an internal topology of a network is not displayed, so that interaction between entities in different domains can be more convenient, and system security can be ensured.

Correspondingly, this application further provides a communications apparatus. The apparatus can implement the API publish method according to the first aspect. For example, the apparatus may be a CCF entity or a chip applied to a CCF entity, or may be another apparatus that can implement the foregoing API publish method. The apparatus can implement the foregoing method by using software, hardware, or hardware executing corresponding software.

In a possible design, the apparatus may include a processor and a memory. The processor is configured to support the apparatus in performing a corresponding function in the method according to the first aspect. The memory is configured to couple to the processor, and the memory stores a program instruction and data that are necessary for the apparatus. In addition, the apparatus may further include a communications interface, configured to support communication between the apparatus and another apparatus. The communications interface may be a transceiver or a transceiver circuit.

In a possible design, the apparatus may include a processing module and a sending module. The processing module is configured to determine a to-be-shared API, and the sending module is configured to share information about the to-be-shared API with a target CCF entity of the to-be-shared API.

In a possible design, the apparatus further includes a receiving module. The receiving module is configured to receive a first API publish request, where the first API publish request includes information about an API and sharing information of the API, and the processing module is specifically configured to determine the to-be-shared API based on the first API publish request.

In a possible design, the processing module is further configured to determine the target CCF entity based on sharing information.

In a possible design, the sharing information includes at least one of sharing indication information, information about the target CCF entity, or target domain indication information, and the sharing indication information is used to indicate that the API is to be shared, the target domain indication information is used to indicate a target domain, and the target domain is different from a domain to which the apparatus belongs.

In a possible design, if the sharing information includes the sharing indication information, the processing module is configured to determine the target CCF entity according to a first preset rule, or if the sharing information includes the information about the target CCF entity, the processing module is configured to determine the target CCF entity based on the information about the target CCF entity, or if the sharing information includes the target domain indication information, the processing module is configured to determine a second target CCF entity based on the target domain indication information, where the second target CCF entity is one or more CCF entities in the target CCF entity, and a domain to which the second target CCF entity belongs is different from the domain to which the apparatus belongs.

In a possible design, the sharing information includes sharing range indication information, and the sharing range indication information is used to indicate a sharing range of the API.

In a possible design, if the sharing range of the to-be-shared API is one or more CCF entities inside a domain to which the apparatus belongs, the processing module is configured to determine the target CCF entity in the CCF entities inside the domain to which the apparatus belongs.

In another possible design, if the sharing range of the to-be-shared API is one or more CCF entities outside a domain to which the apparatus belongs, the processing module is configured to determine the target CCF entity in the CCF entities outside the domain to which the apparatus belongs.

In another possible design, if the sharing range of the to-be-shared API includes one or more CCF entities inside a domain to which the apparatus belongs and one or more CCF entities outside the domain to which the apparatus belongs, the processing module is configured to determine a first target CCF entity in the CCF entities inside the domain to which the apparatus belongs, and determines a second target CCF entity in the CCF entities outside the domain to which the apparatus belongs, where the target CCF entity includes the first target CCF entity and the second target CCF entity.

The first target CCF entity is one or more CCF entities in the target CCF entity, and a domain to which the first target CCF entity belongs is the same as the domain to which the apparatus belongs. The second target CCF entity is one or more CCF entities in the target CCF entity, and a domain to which the second target CCF entity belongs is different from the domain to which the apparatus belongs.

In a possible design, the sharing information further includes target domain indication information, and the target domain indication information is used to indicate a target domain to which the target CCF entity belongs.

In a possible design, determining, by the processing module, the target CCF entity in the CCF entities outside the domain to which the apparatus belongs specifically includes determining, by the processing module, the target CCF entity in one or more CCF entities inside the target domain. In a possible design, determining, by the processing module, the second target CCF entity in the CCF entities outside the domain to which the apparatus belongs specifically includes determining, by the processing module, the second target CCF entity in one or more CCF entities inside the target domain.

In a possible design, if the target domain indication information is an identifier of the target domain, the processing module is specifically configured to determine the second target CCF entity in the target domain according to a second preset rule, or if the target domain indication information includes an identifier of the target domain and inter-domain target CCF entity information, the processing module is specifically configured to determine the second target CCF entity in the target domain based on the inter-domain target CCF entity information.

In a possible design, the processing module is specifically configured to determine the to-be-shared API according to a third preset rule.

In a possible design, the processing module is specifically configured to determine the target CCF entity according to a fourth preset rule.

In a possible design, the target CCF entity includes a first target CCF entity and/or a second target CCF entity, and a domain to which the first target CCF entity belongs is the same as a domain to which the apparatus belongs, and a domain to which the second target CCF entity belongs is different from the domain to which the apparatus belongs.

In a possible design, sharing, by the sending module, the information about the to-be-shared API with the target CCF entity of the to-be-shared API specifically includes sharing, by the sending module, the information about the to-be-shared API with the second target CCF entity, where the information about the to-be-shared API is global information.

In a possible design, the information about the to-be-shared API includes interface information of the to-be-shared API, and the interface information is information about a topology hiding entry point.

According to a second aspect, this application provides an API publish method.

The method may include determining, by an API publish entity, information about an API and sharing information of the API, where the sharing information is used to indicate to a first CCF entity to share the API, and sending, by the API publish entity, a first API publish request to the first CCF entity, where the first API publish request includes the information about the API and the sharing information of the API. In this method, the API publish entity may indicate, in an API publish request message sent to the first CCF entity, whether to share the API, and the first CCF entity may share the information about the to-be-shared API with another CCF entity based on the sharing information, so that the API is published to a plurality of CCF entities. In this way, an API invoking entity can discover and obtain the API by using the plurality of CCF entities.

In a possible design, the sharing information includes at least one of sharing indication information, information about the target CCF entity, or target domain indication information, and the sharing indication information is used to indicate that the API is to be shared, the target domain indication information is used to indicate a target domain, and the target domain is different from a domain to which the first CCF entity belongs.

In a possible design, the sharing information includes sharing range indication information, and the sharing range indication information is used to indicate a sharing range of the API.

In a possible design, the sharing information further includes target domain indication information, and the target domain indication information is used to indicate a target domain to which the target CCF entity belongs.

In a possible design, the target domain indication information is an identifier of the target domain, or the target domain indication information includes an identifier of the target domain and inter-domain target CCF entity information, and the inter-domain target CCF entity information is used to indicate information about a target CCF entity of the to-be-shared API in the target domain.

Correspondingly, this application further provides a communications apparatus. The apparatus can implement the API publish method according to the second aspect. For example, the apparatus may be an API publish entity or a chip applied to an API publish entity, or may be another apparatus that can implement the foregoing API publish method. The apparatus can implement the foregoing method by using software, hardware, or hardware executing corresponding software.

In a possible design, the apparatus may include a processor and a memory. The processor is configured to support the apparatus in performing a corresponding function in the method according to the second aspect. The memory is configured to couple to the processor, and the memory stores a program instruction and data that are necessary for the apparatus. In addition, the apparatus may further include a communications interface, configured to support communication between the apparatus and another apparatus. The communications interface may be a transceiver or a transceiver circuit.

In a possible design, the apparatus may include a processing module and a sending module. The processing module is configured to determine information about an API and sharing information of the API, where the sharing information is used to indicate to a first CCF entity to share the API, and the sending module is configured to send a first API publish request to the first CCF entity, where the first API publish request includes the information about the API and the sharing information of the API.

In a possible design, the sharing information includes at least one of sharing indication information, information about the target CCF entity, or target domain indication information, and the sharing indication information is used to indicate that the API is to be shared, the target domain indication information is used to indicate a target domain, and the target domain is different from a domain to which the first CCF entity belongs.

In a possible design, the sharing information includes sharing range indication information, and the sharing range indication information is used to indicate a sharing range of the API.

In a possible design, the sharing information further includes target domain indication information, and the target domain indication information is used to indicate a target domain to which the target CCF entity belongs.

In a possible design, the target domain indication information is an identifier of the target domain, or the target domain indication information includes an identifier of the target domain and inter-domain target CCF entity information, and the inter-domain target CCF entity information is used to indicate information about a target CCF entity of the to-be-shared API in the target domain.

This application further provides a computer-readable storage medium. The computer-readable storage medium stores an instruction. When the instruction is run on a computer, the computer is enabled to perform the method according to any one of the foregoing aspects.

This application further provides a computer program product including an instruction. When the computer program product is run on a computer, the computer is enabled to perform the method according to any one of the foregoing aspects.

This application further provides a chip system. The chip system includes a processor, and may further include a memory, configured to implement the method according to any one of the foregoing aspects.

This application provides a communications system, including the apparatus for implementing the method according to the first aspect, and the apparatus for implementing the method according to the second aspect.

Any apparatus, computer storage medium, computer program product, chip system, or communications system provided above is configured to perform the corresponding method provided above. Therefore, for beneficial effects that can be achieved by the apparatus, computer storage medium, computer program product, chip system, or communications system provided above, refer to beneficial effects of a corresponding solution in the corresponding method provided above. Details are not described herein again.

DESCRIPTION OF EMBODIMENTS

The following describes in detail an API publish method and an apparatus according to the embodiments of this application with reference to the accompanying drawings.

Figure 1A:
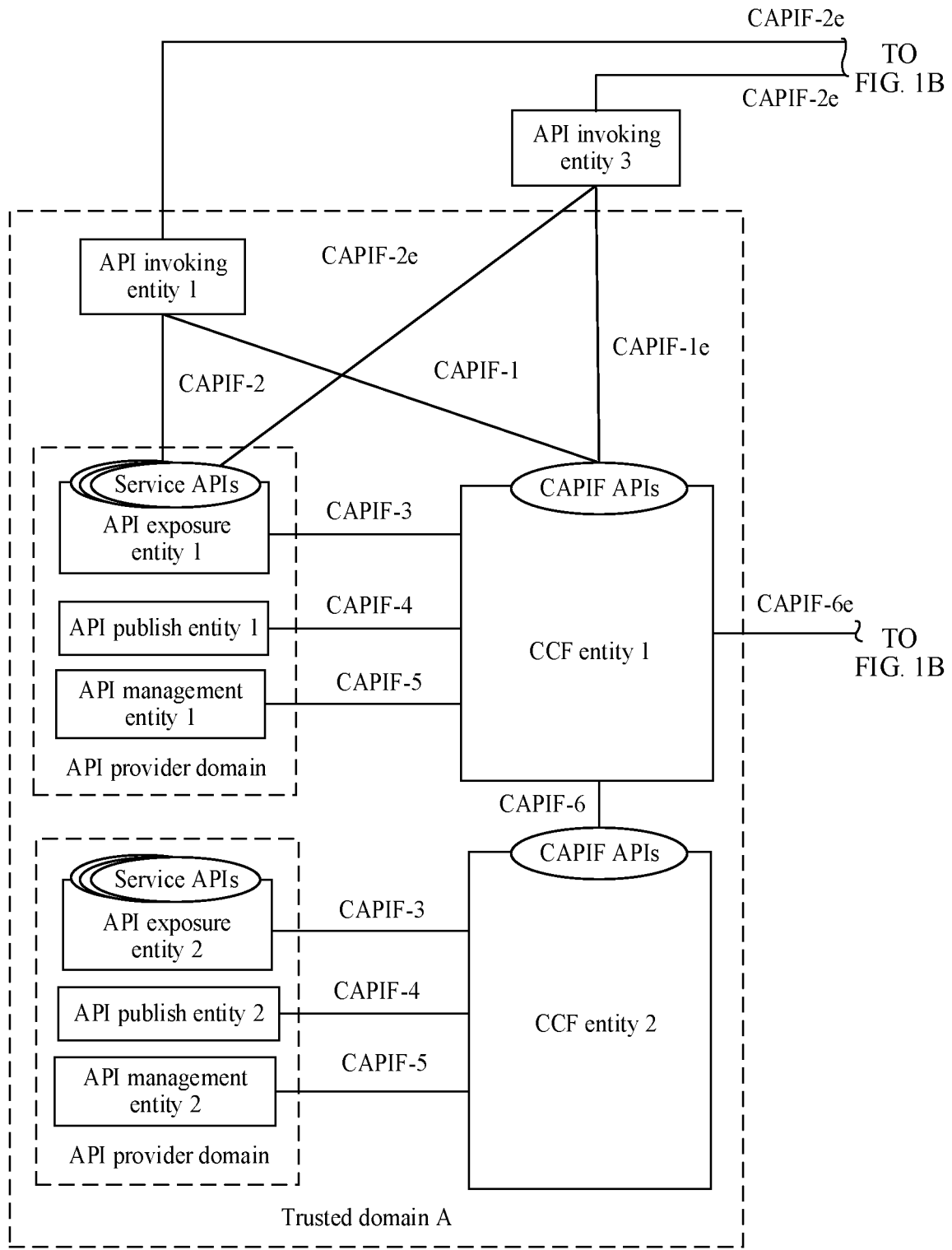
FIG. 1A and FIG. 1B are a schematic diagram of a system architecture to which a technical solution is applicable according to an embodiment of this application.
Figure 1B:
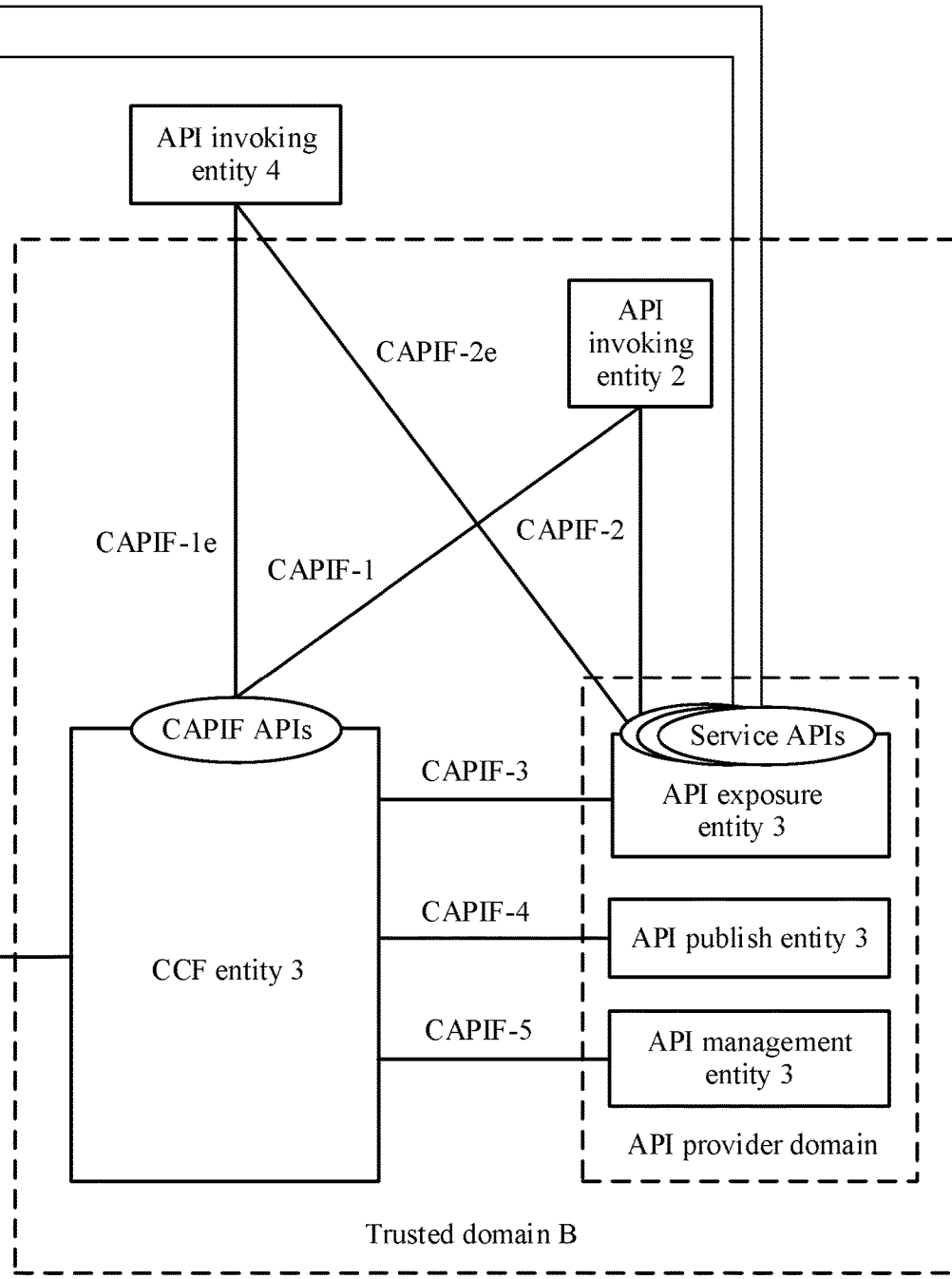

The technical solution provided in this application may be applied to a CAPIF system architecture shown in FIG. 1A and FIG. 1B. The system architecture may include an API invoking entity, a CCF entity, an API exposure function (AEF) entity, an API publish function (APF) entity, an API management function (APIMF) entity, and the like.

The API invoking entity is a logical function entity that invokes, accesses, and uses an API, and may also be referred to as an API invoking entity. Capabilities supported by the API invoking entity may include authentication performed on the API invoking entity, where for example, the authentication is implemented by authenticating an identifier of the API invoking entity and other information, mutual authentication with a CAPIF, obtaining authorization before accessing an API, discovering APIs, invoking an API, and the like. The API invoking entity may be a third-party application that signs a service agreement with a PLMN operator, or may be an application of a PLMN operator, for example, a machine-to-machine (M2M) application, an internet of things (IoT) application, or a V2X application.

The CCF entity is configured to provide an API of a CAPIF. Capabilities supported by the CCF entity may include performing authentication on an API invoking entity based on an identifier of the API invoking entity and other information, performing mutual authentication with the API invoking entity, providing authorization to the API invoking entity before the API invoking entity accesses the API, publishing, storing, and supporting discovery of the API, being responsible for access control of the API according to a policy of a PLMN operator, storing a log invoked by the API and providing the log to an authorization entity, performing charging based on the API log, detecting invocation of the API, registration of the API invoking entity, storing a configuration policy, auditing the invoked log, and the like.

The AEF entity is configured to provide an API, and is also an entry used by the API invoking entity to invoke the API. Capabilities supported by the AEF entity may include performing authentication on an API invoking entity based on an identifier of the API invoking entity and other information that is provided by a CCF entity, determining authorization provided by the CCF entity, synchronizing an API log to the CCF entity, and the like.

The APF entity provides an APF, so that the API invoking entity can discover an API. A capability supported by the APF entity may include publishing an API function.

The APIMF entity provides an APIMF. Capabilities supported by the APIMF entity may include auditing an API invoking log provided by a CCF entity, monitoring an event reported by the CCF entity, configuring, for an API, a policy of an API provider, detecting a status of an API, and registering an API invoking entity.

The AEF entity, the APF entity, and the APIMF entity belong to an API provider domain. One API provider domain may include one APF entity, one APIMF entity, and one or more AEF entities.

The system architecture may include one or more trusted domains. For example, a trusted domain may be a PLMN network domain. For example, a trusted domain A is a PLMN network domain of an operator A, and a trusted domain B is a PLMN network domain of an operator B. A same operator controls and provides sufficient security protection for entities in one trusted domain. Alternatively, for a same operator, different trusted domains may be obtained internally through division based on different security control granularities. For example, a trusted domain may be a network corresponding to a region in a PLMN network domain. For example, a trusted domain A is a PLMN network of an operator Z in a northwest region, and a trusted domain B is a PLMN network of an operator Z in the Beijing region. In this application, a trusted domain is referred to as a domain. A domain may include an API invoking entity, an AEF entity, an APF entity, an APIMF entity, and one or more CCF entities. For example, an API exposure entity 1, an API publish entity 1, an API management entity 1, a CCF entity 1, an API exposure entity 2, an API publish entity 2, an API management entity 2, a CCF entity 2, and an API invoking entity 1 belong to a trusted domain A, and an API exposure entity 3, an API publish entity 3, an API management entity 3, a CCF entity 3, and an API invoking entity 2 belong to a trusted domain B.

In a trusted domain, an AEF entity may communicate with a CCF entity through a CAPIF-3 interface, an APF entity may communicate with a CCF entity through a CAPIF-4 interface, an APIMF entity may communicate with a CCF entity through a CAPIF-5 interface, and different CCF entities may communicate with each other through a CAPIF-6 interface. In a trusted domain, an API invoking entity may invoke an API in the trusted domain through a CAPIF-2 interface. An API invoking entity not belonging to a trusted domain (that is, outside the trusted domain) may invoke an API in the trusted domain through a CAPIF-2e interface. For example, an API invoking entity 1 has a subscription relationship with an operator A, and a PLMN network domain of the operator A is a trusted domain A. In other words, the API invoking entity 1 belongs to the trusted domain A. That is, the API invoking entity 1 is in the trusted domain A.

Each trusted domain may have a top-level (domain-bound) CCF entity, and the trusted domain may be further connected to no low-level CCF entity or a plurality of low-level CCF entities. In addition, a top-level CCF entity in a trusted domain may be further connected to a top-level CCF entity in another trusted domain, and CCF entities in different trusted domains communicate with each other through CAPIF-6e interface. CAPIF-6 (an interface between two CCFs in a CAPIF in a same trusted domain) supports at least functions of the CAPIF-3 interface, the CAPIF-4 interface, and the CAPIF-5 interface. CAPIF-6e may support functions that are of the CAPIF-3 interface, the CAPIF-4 interface, and the CAPIF-5 interface and that are of cross-system security.

Optionally, the function entities in FIG. 1A and FIG. 1B may be implemented by one physical device, or may be jointly implemented by a plurality of physical devices, or may be a logical function module in one physical device. This is not specifically limited in this embodiment of this application.

For example, in the foregoing network architecture, the API invoking entity, the AEF entity, the APF entity, the APIMF entity, or the CCF entity may be a device in a PLMN network, for example, may be a device in a 4th generation (4G) or 5th generation (5G) mobile communications system.

The API invoking entity, the AEF entity, the APF entity, the APIMF entity, or the CCF entity may run in a terminal device, or may run in a network device. For example, the API invoking entity may be a mobility management entity (MME), a radio access network (RAN) device, a policy and charging rules function (PCRF) entity, a home subscriber server (HSS), a broadcast/multicast service center (BM-SC), a serving-call session control function (S-CSCF), an application function (AF) entity, or the like in the 4G communications system, or the API invoking entity may be an access and mobility management function (AMF) entity, a session management function (SMF) entity, a unified data management (UDM) entity, a user plane function (UPF) entity, a policy control function (PCF) entity, an authentication server function (AUSF) entity, a network exposure function (NEF) entity, a network slice selection function (NSSF) entity, a network function repository function (NRF) entity, an AF entity, or the like in the 5G communications system.

The AEF entity may be a service capability exposure function (SCEF) entity running in a 4G network. Alternatively, the AEF entity may be a NEF entity running in a 5G network, or an AMF entity, an SMF entity, a UDM entity, a PCF entity, an NRF entity, an AUSF entity, or an NS SF entity.

The CCF entity may be independently deployed in an independent network entity, or the CCF entity and an entity that is in an API provider domain may be deployed together in the SCEF entity in the 4G network or in the NEF entity in the 5G network.

It should be noted that the system architecture described in this embodiment of this application is intended to describe the technical solutions in the embodiments of this application more clearly, and does not constitute any limitation on the technical solutions provided in the embodiments of this application. A person of ordinary skill in the art may learn that with evolution of the system architecture, the technical solutions provided in the embodiments of this application are also applicable to similar technical problems.

Figure 2:
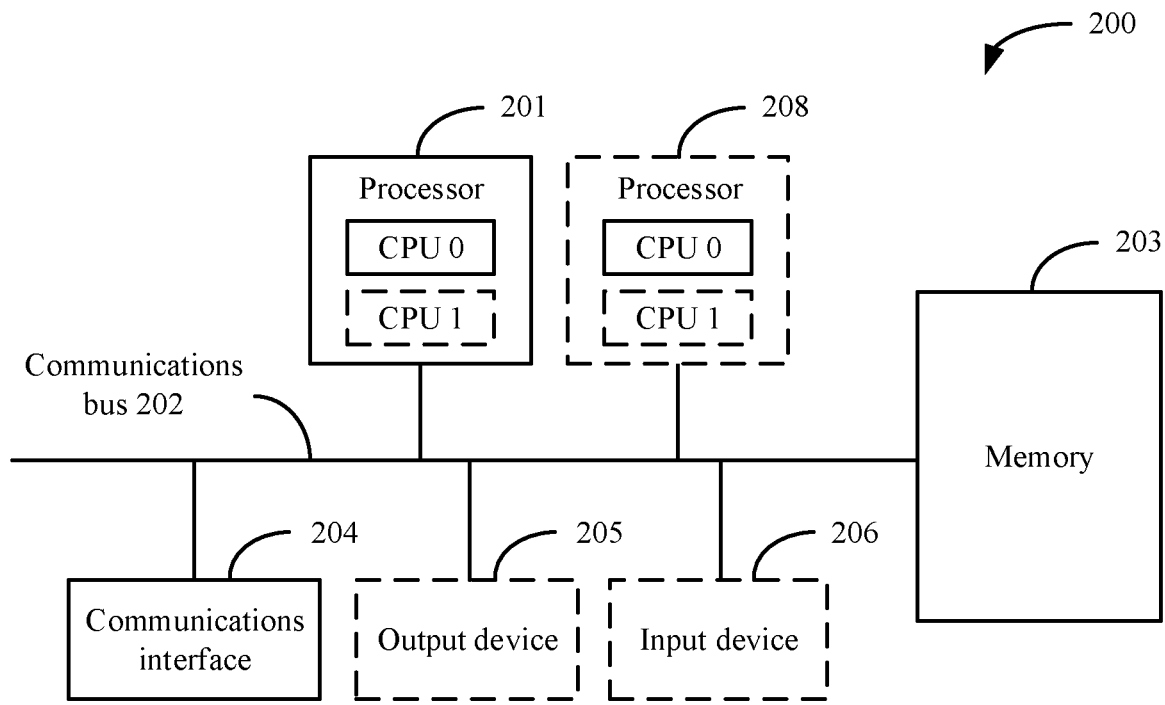
FIG. 2 is a schematic structural diagram of a communications apparatus to which a technical solution is applicable according to an embodiment of this application.

In an example, as shown in FIG. 2, each of the API invoking entity, the AEF entity, the APF entity, the APIMF entity, and the CCF entity in FIG. 1A and FIG. 1B can be implemented by an apparatus 200 in FIG. 2.

FIG. 2 is a schematic structural diagram of hardware of an apparatus 200 according to an embodiment of this application. The apparatus 200 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits configured to control execution of a program in a solution of this application.

The communications bus 202 may include a channel for transmitting information between the foregoing components.

The communications interface 204 is configured to communicate, by using any apparatus such as a transceiver, with another device or communications network such as the Ethernet, a RAN, or a wireless local area network (WLAN).

The memory 203 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a BLU-RAY optical disc, and the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor by using the bus. The memory may be integrated with the processor.

The memory 203 is configured to store application program code for executing the solutions in this application, and the processor 201 controls the execution. The processor 201 is configured to execute the application program code stored in the memory 203, to implement the API publish method provided in the following embodiments of this application.

During specific implementation, in an embodiment, the processor 201 may include one or more CPUs such as a CPU 0 and a CPU 1 in FIG. 2.

During specific implementation, in an embodiment, the apparatus 200 may include a plurality of processors such as a processor 201 and a processor 208 in FIG. 2. Each of these processors may be a single-core (single-CPU) processor, or may be a multi-core (multi-CPU) processor. The processor herein may be one or more devices, circuits, and/or processing cores configured to process data (for example, a computer program instruction).

During specific implementation, in an embodiment, the apparatus 200 may further include an output device 205 and an input device 206. The output device 205 communicates with the processor 201, and may display information in a plurality of manners. For example, the output device 205 may be a liquid-crystal display (LCD), a light-emitting diode (LED) display device, a cathode-ray tube (CRT) display device, a projector, or the like. The input device 206 communicates with the processor 201, and may receive an input from a user in a plurality of manners. For example, the input device 206 may be a mouse, a keyboard, a touchscreen device, a sensing device, or the like.

The apparatus 200 may be a general-purpose communications device or a special-purpose communications device. During specific implementation, the apparatus 200 may be a desktop computer, a portable computer, a network server, a palmtop computer, a personal digital assistant (PDA), a mobile phone, a tablet computer, a wireless terminal device, an embedded device, or a device having a structure similar to that in FIG. 2. A type of the apparatus 200 is not limited in this embodiment of this application.

For ease of understanding of the technical solutions of the embodiments of this application, terms used in this application are explained below.

1. Sharing an API

After an API publish entity publishes APIs to a CCF entity, the CCF entity may publish these APIs to another CCF entity inside a domain to which the CCF entity belongs, or publish these APIs to another CCF entity outside the domain to which the CCF entity belongs. A process in which a CCF entity publishes an obtained API to another CCF entity is referred to as sharing an API.

2. Target CCF Entity

In a process in which an API is shared by a CCF entity with one or more other CCF entities, the CCF entity performing the sharing process is a source CCF entity, and the one or more CCF entities receiving the shared API are target CCF entities for sharing the API.

3. Target Domain

A CAPIF system architecture may include a plurality of domains, and each domain may include one or more CCF entities. In a process in which an API is shared, if a domain to which a target CCF entity belongs is different from a domain to which a source CCF entity belongs, the domain to which the target CCF entity belongs is a target domain for sharing the API by the source CCF entity. For example, a CCF entity 1 belongs to a trusted domain A, and a CCF entity 3 belongs to a trusted domain B. If the CCF entity 1 shares an API with the CCF entity 3, the trusted domain B is a target domain for sharing the API by the CCF entity 1.

In description of this application, "/" means "or" unless otherwise specified. For example, A/B may represent A or B. In this specification, "and/or" describes only an association relationship for describing associated objects and represents that three relationships may exist. For example, A and/or B may represent the following three cases only A exists, both A and B exist, and only B exists. In addition, in description of this application, "a plurality of" means two or more than two unless otherwise specified. In addition, for ease of clear description of the technical solutions of the embodiments of this application, terms such as "first" and "second" are used in the embodiments of this application to distinguish between same items or similar items that have basically same functions. A person skilled in the art may understand that the terms such as "first" and "second" are not intended to limit a quantity or an execution sequence, and the terms such as "first" and "second" do not indicate a definite difference. This is not specifically limited in the embodiments of this application. In the embodiments of this application, the word "exemplary" or "for example" or the like is used to represent giving an example, an illustration, or a description. Any embodiment or design scheme described as "exemplary" or "for example" in the embodiments of this application should not be explained as being more preferred or having more advantages than another embodiment or design scheme. Exactly, use of the word "exemplary" or "for example" or the like is intended to present a relative concept in a specific manner.

The following describes in detail the API publish methods provided in the embodiments of this application with reference to FIG. 1A and FIG. 1B and FIG. 2.

Embodiment 1

Figure 3:
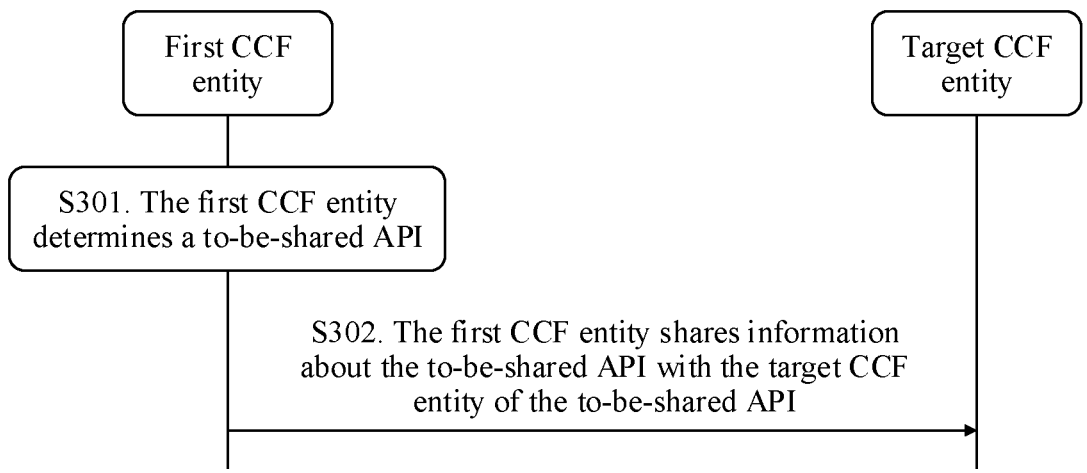
FIG. 3 is a schematic diagram 1 of an API publish method according to an embodiment of this application.

An embodiment of this application provides an API publish method. As shown in FIG. 3, the method may include the following steps.

S301. A first CCF entity determines a to-be-shared API.

An API provider may publish an API in an AEF entity to a CCF entity by using an API publish entity. In this way, an API invoking entity can discover and obtain, by using the CCF entity, the API provided by the AEF entity, to invoke the API. Invoking an API may also be understood as accessing an API. The API invoking entity can obtain a required resource and service such as a broadcast transmission resource and a video acceleration service by invoking an API.

The first CCF entity may be a CCF entity in a CAPIF system architecture. The API publish entity of the API provider is connected to the first CCF entity through a CAPIF-4 interface. For example, the first CCF entity is a domain-bound CCF entity in a domain. For example, the first CCF entity is the CCF entity 1 in FIG. 1A and FIG. 1B.

The first CCF entity may share the API published to the first CCF entity with a target CCF entity. In this way, the API invoking entity can discover and obtain the shared API by using the target CCF entity.

The first CCF entity determines the to-be-shared API. In an implementation such as Embodiment 2 or Embodiment 4, the first CCF entity receives a first API publish request message from the API publish entity, and determines the to-be-shared API based on the first API publish request message. In another implementation such as Embodiment 3, the first CCF entity determines the to-be-shared API according to a third preset rule.

S302. The first CCF entity shares information about the to-be-shared API with the target CCF entity of the to-be-shared API.

The first CCF entity determines the target CCF entity of the to-be-shared API. In an implementation, the first CCF entity receives a first API publish request message from the API publish entity, and determines the target CCF entity of the to-be-shared API based on the first API publish request message. In another implementation, the first CCF entity determines the target CCF entity of the to-be-shared API according to a fourth preset rule.

Further, the first CCF entity shares the information about the to-be-shared API with the target CCF entity of the to-be-shared API.

Information about an API may include an API identifier, an API type, interface information of the API, or the like. For example, the API identifier is used to identify the API. For example, the API identifier may be a number (for example, a letter, a digit, a special symbol, or a free combination of at least two of a letter, a digit, and a special symbol) of the API, or may be a name of the API, an index of the API, a uniform resource locator (URL) of the API, or the like. The API type may be a V2X service, an IoT service, an M2M service, or the like. The interface information of the API may be a fully qualified domain name (FQDN) of an AEF entity, an internet protocol (IP) address of the AEF entity, a port number of the AEF entity, an IP address and a port number of the AEF entity, or the like.

For example, information about an API is shown in Table 1.

TABLE 1

| API identifier | API type | Interface information of an API |
| --- | --- | --- |
| 1 | V2X service | 192.0.0.0 |
| 2 | IoT service | 192.0.0.1 |

It should be noted that if a domain to which the target CCF entity belongs is the same as a domain to which the first CCF entity belongs, the information about the API may be unique information in the domain. For example, the API identifier is a unique identifier in the domain. If a domain to which the target CCF entity belongs is different from a domain to which the first CCF entity belongs, the information about the API may be global information. For example, the API identifier is a globally unique identifier. The global information may be understood as information that is about the API and that can be identified in all domains in the CAPIF system. A global address may be understood as an address that can be identified in all the domains in the CAPIF system.

According to the API publish method provided in this embodiment of this application, the first CCF entity may share the API with another CCF entity, so that the API is published to a plurality of CCF entities. In this way, the API invoking entity can discover and obtain the API by using the plurality of CCF entities.

Embodiment 2

Figure 4:
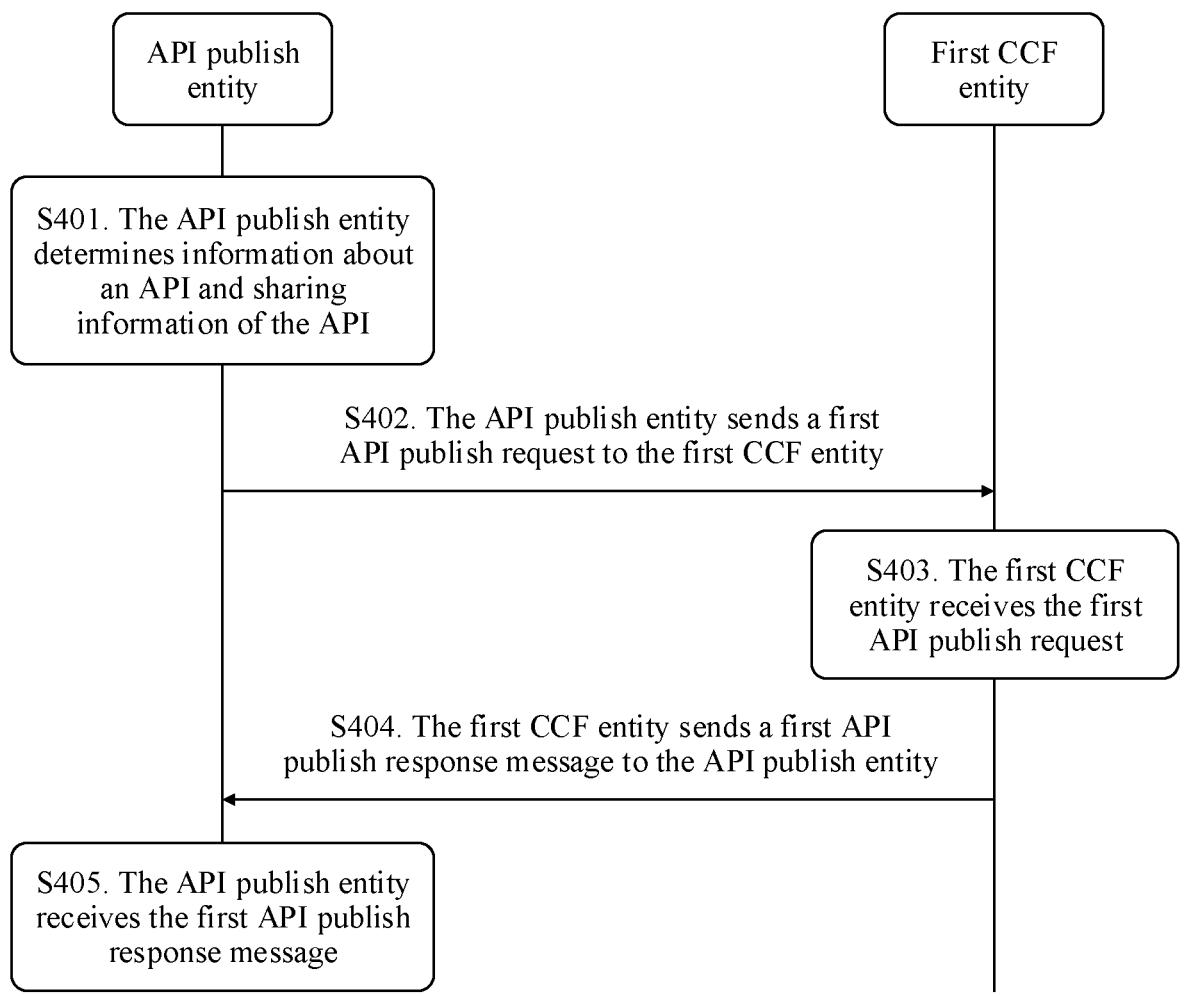
FIG. 4 is a schematic diagram 2 of an API publish method according to an embodiment of this application.

An embodiment of this application provides an API publish method. As shown in FIG. 4, the method may include the following steps.

S401. An API publish entity determines information about an API and sharing information of the API.

The API publish entity determines the information about the API, where the API is a to-be-shared API, and determines the sharing information of the API.

The API publish entity may be an APF entity, or the API publish entity may be an APIMF entity. Certainly, the API publish entity may alternatively be another entity in a CAPIF system architecture. This is not limited in this embodiment of this application. In this embodiment of this application, an example in which the API publish entity is an APF entity is used for description.

In an implementation, the API publish entity receives a user instruction (for example, a user selects a to-be-published API and a target CCF entity of the to-be-published API by using a human-computer interactive operation page), and obtains the to-be-shared API and a target CCF entity of the to-be-shared API.

In another implementation, the API publish entity may determine the to-be-shared API and a target CCF entity of the to-be-shared API according to a fifth preset rule. For example, the fifth preset rule may be a mapping relationship between commercial subscription information and a target CCF entity that is for publishing (which may also be understood as a mapping relationship between an API type and a domain of a target CCF entity), an API type, a mapping relationship between an API type and a target CCF entity that is for publishing (which may also be understood as a mapping relationship between an API type and a logical domain or a geographic region of a target CCF entity), or the like. For example, an operator B and an operator A have a subscription for sharing an API for use. To be specific, the operator B can obtain and use any API of the operator A. An API publish entity of the operator A determines, based on subscription information indicating sharing of an API for use with the operator B, to publish the API to a trusted domain (for example, the CCF entity 3 in FIG. 1A and FIG. 1B) corresponding to the operator B. For another example, the fifth preset rule may be sharing an API of a V2X type with a CCF entity 3, and sharing an API of an IoT type with a CCF entity 2. In this case, when an API 1 is an API of the V2X type, an APF entity 1 determines to share the API 1 with the CCF entity 3, and when an API 2 is an API of the IoT type, the APF entity 1 determines to share the API 2 with the CCF entity 2. Certainly, the API publish entity 1 may alternatively determine, according to another rule, a target CCF entity for sharing an API. This is not limited in this embodiment of this application.

In an implementation, the API publish entity publishes the API to a CCF entity (briefly referred to as a CCF entity corresponding to the API publish entity) connected to the API publish entity through a CAPIF-4 interface. In this case, the API publish entity does not determine whether to share the API, but the CCF entity corresponding to the API publish entity determines whether to share the API. For example, the API publish entity sends a third API publish request message to the corresponding CCF entity. The third API publish request message includes the information about the API. For example, the third API publish request message may be a service API publish request, or a service API configuration request. For example, the API publish entity sends the information about the API to the CCF entity corresponding to the API publish entity. For example, in FIG. 1A and FIG. 1B, the API publish entity 1 sends information about an API 1, an API 2, and an API 3 to the CCF entity 1. In this case, the API publish entity may not generate the sharing information of the API, or may not send the sharing information of the API to the CCF entity.

In another implementation, the API publish entity determines whether to share the API. If the API publish entity determines to prohibit sharing of the API, in an example, the API publish entity sends the information about the API and indication information of prohibiting sharing of the API to a first CCF entity, and in another example, the API publish entity sends only the information about the API to a first CCF entity, indicating that sharing of the API is prohibited. If determining to share the API, the API publish entity determines the sharing information of the API. The sharing information of the API is used to indicate to a first CCF entity to share the API. The sharing information may include at least one of sharing indication information, intra-domain target CCF entity information, or target domain indication information. The sharing indication information is used to indicate that the API is to be shared. The target domain indication information is used to indicate a target domain, and the target domain is different from a domain to which the first CCF entity belongs. The intra-domain target CCF entity information is used to indicate the information about the target CCF entity of the API in the domain to which the first CCF entity belongs. For example, in an implementation, the indication information of prohibiting sharing of the API and the sharing indication information may be represented by using different values of a same parameter. For example, a parameter value is 0, indicating that sharing is prohibited, a parameter value is 1, indicating that sharing is allowed, or a parameter value is 2, indicating that whether sharing is allowed is not specified. Alternatively, the indication information of prohibiting sharing of the API and the sharing indication information may be implemented by using different parameters.

The intra-domain target CCF entity information may be an identifier of a CCF entity, an FQDN domain name, an IP address, an IP address and a port number, a URL, or the like. The target domain indication information may be an identifier of the target domain, for example, a PLMN identifier (ID) or a domain name (for example, domain.com). Alternatively, the target domain indication information may include an identifier of the target domain and inter-domain target CCF entity information. The inter-domain target CCF entity information may be an identifier of a CCF entity, an FQDN domain name, an IP address, an IP address and a port number, a URL, or the like.

In some embodiments, the sharing information may further include information about the target CCF entity. The information about the target CCF entity may be an identifier of the target CCF entity, an FQDN domain name, an IP address, an IP address and a port number, a URL, or the like.

It should be noted that the sharing indication information, the intra-domain target CCF entity information, or the target domain indication information may appear by being combined in a plurality of manners. This is not limited in this embodiment of this application. For example, the sharing information is sharing indication information, the sharing information is intra-domain target CCF entity information, the sharing information is target domain indication information, the sharing information includes sharing indication information and intra-domain target CCF entity information, the sharing information includes sharing indication information and target domain indication information, the sharing information includes intra-domain target CCF entity information and target domain indication information, or the sharing information includes sharing indication information, intra-domain target CCF entity information, and target domain indication information. The information about the target CCF entity may appear independently, or may appear by being combined with the sharing indication information, the intra-domain target CCF entity information, or the target domain indication information. This is not limited in this embodiment of this application.

For example, in FIG. 1A and FIG. 1B, the trusted domain A is a PLMN network domain of the operator A, the CCF entity 1 is a CCF entity deployed in the Xi'an region by the operator A and is configured to manage an API provided by an AEF entity in the Xi'an region, and the CCF entity 2 is a CCF entity deployed in the Ningxia region by the operator A and is configured to manage an API provided by an AEF entity in the Ningxia region. The API publish entity 1 is the operator A in the Xi'an region, the API publish entity 2 is the operator A in the Ningxia region, and the trusted domain B is a PLMN network domain of the operator B. The API publish entity (the API publish entity 1) determines to publish the API 1 to the CCF entity 1. The API publish entity determines to share the API 2 to the Ningxia region, and in this case, determines to publish the API 2 to the CCF entity 1, and the CCF entity 1 publishes the API 2 to the CCF entity 2. The API publish entity determines to share the API 3 to the Ningxia region and the PLMN network domain of the operator B, and in this case, determines to publish the API 3 to the CCF entity 1, and the CCF entity 1 publishes the API 3 to the CCF entity 2 and the CCF entity 3. Then, the API publish entity 1 may determine not to specify sharing of the API 1, but specify that to-be-shared APIs include the API 2 and the API 3.

In an implementation, the API publish entity (the API publish entity 1) determines that the sharing information is sharing indication information. The sharing indication information indicates to the first CCF entity (the CCF entity 1) to share the to-be-shared APIs (the API 2 and the API 3). In this case, the CCF entity determines a target CCF entity for sharing the APIs.

In another implementation, the API publish entity (the API publish entity 1) determines that a target CCF entity for sharing the API 2 is the CCF entity 2, and determines that the sharing information includes intra-domain target CCF entity information. The intra-domain target CCF entity information includes information about the CCF entity 2. In some examples, the API publish entity (the API publish entity 1) determines that a target CCF entity for sharing the API 2 is the CCF entity 2, and determines that the sharing information includes information about the target CCF entity, that is, includes information about the CCF entity 2.

In still another implementation, the API publish entity (the API publish entity 1) determines that target CCF entities for sharing the API 3 includes the CCF entity 2 and the CCF entity 3, and determines that the sharing information includes intra-domain target CCF entity information and target domain indication information. The intra-domain target CCF entity information includes information about the CCF entity 2, and the target domain indication information indicates the trusted domain B (a domain to which the CCF entity 3 belongs). In some examples, the API publish entity (the API publish entity 1) determines that target CCF entities for sharing the API 3 includes the CCF entity 2 and the CCF entity 3, and determines that the sharing information includes information about the target CCF entities (the CCF entity 2 and the CCF entity 3).

In another example, in FIG. 1A and FIG. 1B, the trusted domain A is a PLMN network domain of the operator A, the CCF entity 1 is a top-level (which is also referred to as domain-bound) CCF entity deployed by the operator A and is configured to manage APIs in the entire network domain of the operator A and another CCF entity, and the CCF entity 2 is a CCF entity deployed in the Ningxia region by the operator A and is configured to manage an API provided by an AEF entity in the Ningxia region. The trusted domain B is a PLMN network domain of the operator B, and the CCF entity 3 is a top-level (which is also referred to as domain-bound) CCF entity in the PLMN network domain of the operator B and is configured to manage APIs in the entire network domain of the operator B and another CCF entity in the domain. The API publish entity 2 in the Ningxia region determines that the API 2 needs to be shared to the entire network of the operator A, and in this case, publishes the API 2 to the CCF entity 2, and the CCF entity 2 publishes the API 2 to the CCF entity 1. The API publish entity 2 in the Ningxia region determines that the API 3 needs to be shared to the PLMN network domain of the operator A and the PLMN network domain of the operator B, and in this case, publishes the API 3 to the CCF entity 2, and the CCF entity 2 publishes the API 3 to the CCF entity 1 and the CCF entity 3. Then, the API publish entity 2 may determine that to-be-shared APIs are the API 2 and the API 3.

In an implementation, the API publish entity (the API publish entity 2) determines that the sharing information is sharing indication information, and the sharing indication information indicates the first CCF entity (the CCF entity 2) to share the to-be-shared APIs (the API 2 and the API 3).

In another implementation, the API publish entity (the API publish entity 2) determines that a target CCF entity for sharing the API 2 is the CCF entity 1, and determines that the sharing information includes intra-domain target CCF entity information. The intra-domain target CCF entity information includes information about the CCF entity 1. In some examples, the API publish entity (the API publish entity 2) determines that a target CCF entity for sharing the API 2 is the CCF entity 1, and determines that the sharing information includes information about the target CCF entity, that is, includes information about the CCF entity 1.

In still another implementation, the API publish entity (the API publish entity 2) determines that target CCF entities for sharing the API 3 include the CCF entity 1 and the CCF entity 3, and determines that the sharing information includes intra-domain target CCF entity information and target domain indication information. The intra-domain target CCF entity information includes information about the CCF entity 1, and the target domain indication information indicates the trusted domain B (a domain to which the CCF entity 3 belongs). In some examples, the API publish entity (the API publish entity 2) determines that target CCF entities for sharing the API 3 include the CCF entity 1 and the CCF entity 3, and determines that the sharing information includes information about the target CCF entities (the CCF entity 2 and the CCF entity 3).

S402. The API publish entity sends a first API publish request to the first CCF entity.

The API publish entity sends the first API publish request to the first CCF entity. The first API publish request includes the information about the API and the sharing information of the API. For example, the first API publish request message may be a service API publish request (service API publish request), or a service API configuration request (service API configuration request).

In an implementation, one first API publish request includes information about one API and sharing information of the API. For example, a first API publish request includes information about the API 1 and sharing information of the API 1. The first CCF entity shares the API 1 based on the sharing information of the API 1, and the to-be-shared API is the API 1.

In an implementation, one first API publish request includes information about a plurality of APIs and sharing information corresponding to each API. For example, a first API publish request includes information about the API 1 and sharing information of the API 1, information about the API 2 and sharing information of the API 2, and information about the API 3 and sharing information of the API 3. The first CCF entity shares each API based on sharing information of each API. For example, the first CCF entity shares the API 1 based on the sharing information of the API 1, shares the API 2 based on the sharing information of the API 2, and shares the API 3 based on the sharing information of the API 3. To-be-shared APIs are the API 1, the API 2, and the API 3.

In an implementation, one first API publish request includes information about a plurality of APIs and one piece of sharing information corresponding to the plurality of APIs. For example, a first API publish request includes information about the API 1, information about the API 2, information about the API 3, and sharing information, and the first CCF entity shares the API 1, the API 2, and the API 3 based on the sharing information. To-be-shared APIs are the API 1, the API 2, and the API 3.

In an implementation, the information about the API may include the sharing information of the API, that is, the sharing information of the API may be used as an attribute of the API. For example, the information about the API may include an API identifier, an API type, and sharing information of the API. In another implementation, the information about the API and the sharing information of the API may each be independent information. This is not limited in this embodiment of this application.

In this embodiment of this application, the example in which one first API publish request includes information about one API and sharing information of the one API is used for description. A person skilled in the art may understand that the technical solution in which the first API publish request includes information about one API and sharing information of the one API is also applicable to scenarios in which one first API publish request includes information about a plurality of APIs and sharing information corresponding to each API, and one first API publish request includes information about a plurality of APIs and one piece of sharing information corresponding to the plurality of APIs. Details are not described again in this embodiment of this application.

S403. The first CCF entity receives the first API publish request.

After receiving the first API publish request, the first CCF entity may store received information about the API.

S404. The first CCF entity sends a first API publish response message to the API publish entity.

The first CCF entity sends the first API publish response message to the API publish entity. In an example, the first API publish response message may include publish result indication information, to indicate that the API is successfully published or the API is unsuccessfully published. For example, the API publish response message may be a service API publish response, or a service API configuration response.

S405. The API publish entity receives the first API publish response message.

According to the API publish method provided in this embodiment of this application, the API publish entity may indicate whether to share an API in an API publish request message that is to be sent to the first CCF entity, and further, may further indicate a target CCF entity of the API. In this way, the first CCF entity may share information about the API with another CCF entity based on the sharing information, so that the API is published to a plurality of CCF entities. In this way, an API invoking entity can discover and obtain the API by using the plurality of CCF entities.

Embodiment 3

Figure 5A:
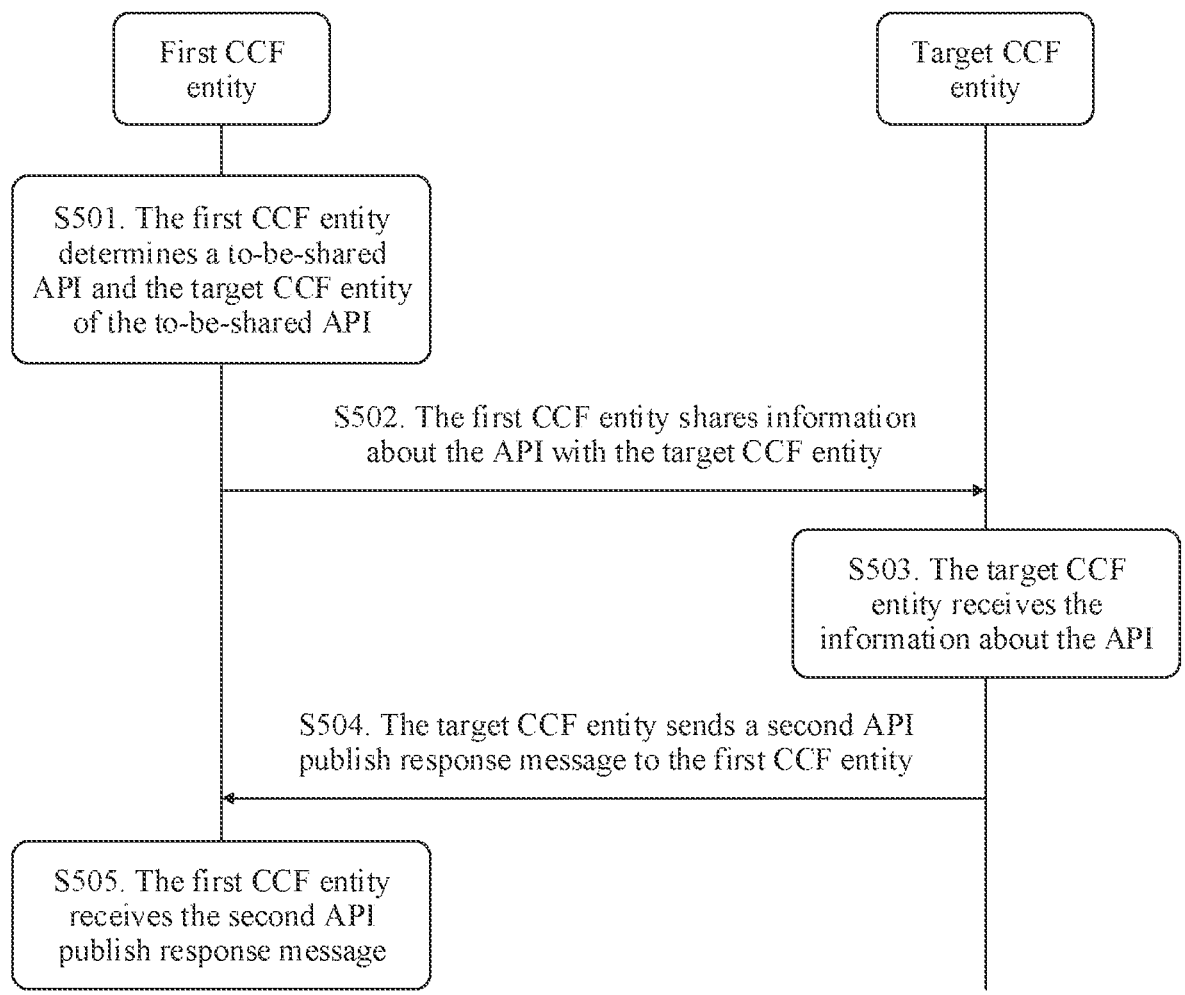
FIG. 5A is a schematic diagram 3 of an API publish method according to an embodiment of this application.

An embodiment of this application provides an API publish method. As shown in FIG. 5A, the method may include the following steps.

S501. A first CCF entity determines a to-be-shared API and a target CCF entity of the to-be-shared API.

The first CCF entity determines the to-be-shared API and the target CCF entity of the to-be-shared API. The target CCF entity may include a first target CCF entity and/or a second target CCF entity, and a domain to which the first target CCF entity belongs is the same as a domain to which the first CCF entity belongs, and a domain to which the second target CCF entity belongs is different from the domain to which the first CCF entity belongs.

Manner 1.

The first CCF entity determines a to-be-shared API and a target CCF entity of the to-be-shared API based on a received first API publish request. The first API publish request includes information about an API and sharing information of the API.

In an implementation, the first CCF entity determines the to-be-shared API based on the information about the API and the sharing information of the API. When the first API publish request includes the sharing information of the API, the first CCF entity determines that the API indicated by the information about the API in the first API publish request is the to-be-shared API. In another implementation, the first CCF entity determines the to-be-shared API based on the information about the API in the first API publish request according to a sixth preset rule. For example, the sixth preset rule may include determining the to-be-shared API based on a mapping relationship between commercial subscription information and a target CCF entity that is for publishing, or determining the to-be-shared API based on an API type, a type of an API, or a mapping relationship between an API type and a target CCF entity that is for publishing. For a specific method for determining the to-be-shared API by the first CCF entity according to the sixth preset rule, refer to the description of determining the target CCF entity of the to-be-shared API by the API publish entity according to the fifth preset rule in S401 in Embodiment 2. Details are not described herein again. Certainly, the first CCF entity may alternatively determine the to-be-shared API in another manner, for example, according to another preset rule. This is not limited in this embodiment of this application.

In an implementation, the first CCF entity determines the target CCF entity of the to-be-shared API based on sharing information.

In an example, the sharing information is sharing indication information, and the first CCF entity determines a target CCF entity according to a first preset rule. For example, the first preset rule may include determining the target CCF entity for API sharing based on a mapping relationship between commercial subscription information and a target CCF entity that is for publishing (which may also be understood as a mapping relationship between an API type and a domain of a target CCF entity), or determining the target CCF entity for API sharing based on a mapping relationship between an API type and a target CCF entity that is for publishing (which may also be understood as a mapping relationship between an API type and a logical domain or a geographic region of a target CCF entity). For a specific method for determining the target CCF entity by the first CCF entity according to the first preset rule, refer to the description of determining the API publish range by the API publish entity according to the fifth preset rule in S401 in Embodiment 2. Details are not described herein again. Certainly, the first CCF entity may alternatively determine the target CCF entity of the to-be-shared API in another manner, for example, according to another preset rule. This is not limited in this embodiment of this application.

In another example, the sharing information includes intra-domain target CCF entity information (where, for example, the sharing information is intra-domain target CCF entity information, or the sharing information is sharing indication information and intra-domain target CCF entity information), and the first CCF entity determines a first target CCF entity based on the intra-domain target CCF entity information. For example, the intra-domain target CCF entity information includes information about the CCF entity 2, and the first CCF entity determines that the first target CCF entity includes the CCF entity 2.

In another example, the sharing information includes target domain indication information (where, for example, the sharing information is target domain indication information, or the sharing information includes sharing indication information and target domain indication information), and the first CCF entity determines a second target CCF entity based on the target domain indication information. For example, the target domain indication information is an identifier of a target domain, and the first CCF entity determines the second target CCF entity in the target domain according to a second preset rule. For example, the second preset rule is that the target CCF entity is a domain-bound CCF entity in the target domain. For example, the target domain indication information is an identifier of the trusted domain B in FIG. 1A and FIG. 1B, a domain-bound CCF entity in the trusted domain B is a CCF entity 3, and the first CCF entity determines that the second target CCF entity includes the CCF entity 3. For another example, the target domain indication information includes an identifier of a target domain and inter-domain target CCF entity information, and the first CCF entity determines the second target CCF entity in the target domain based on the inter-domain target CCF entity information. For example, the identifier of the target domain is an identifier of the trusted domain B in FIG. 1A and FIG. 1B, the inter-domain target CCF entity information includes information about the CCF entity 3, and the first CCF entity determines that the second target CCF entity includes the CCF entity 3 in the trusted domain B.

In another example, the sharing information includes sharing indication information, intra-domain target CCF entity information, and target domain indication information, and the first CCF entity determines a first target CCF entity based on the intra-domain target CCF entity information, and determines a second target CCF entity based on the target domain indication information. For example, the sharing indication information is a numerical value, and the first CCF entity determines the target CCF entity based on a value of the sharing indication information. For example, if the sharing indication information is "00", it indicates that the to-be-shared API is shared with a CCF entity inside a domain to which the first CCF entity belongs, and the first CCF entity determines, as the target CCF entity, the CCF entity indicated by the intra-domain target CCF entity information. If the sharing indication information is "01", it indicates that the to-be-shared API is shared with a CCF entity outside a domain to which the first CCF entity belongs, and the first CCF entity determines, as the target CCF entity, the CCF entity indicated by the target domain indication information.

In another example, the sharing information includes information about a target CCF entity (where, for example, the sharing information is information about the target CCF entity, or the sharing information is sharing indication information and information about the target CCF entity, or the sharing information is sharing indication information, information about the target CCF entity, and the target domain indication information, or the sharing information is information about the target CCF entity and the target domain indication information), and the first CCF entity determines the target CCF entity based on the information about the target CCF entity. For example, the first CCF entity may determine, as a target CCF entity, a CCF entity indicated by the information about the target CCF entity, and the target CCF entity may include a first target CCF entity and/or a second target CCF entity. For example, the information about the target CCF entity includes information about a CCF entity 2, and the first CCF entity determines that the target CCF entity includes the CCF entity 2. For example, the information about the target CCF entity includes information about a CCF entity 3, and the first CCF entity determines that the target CCF entity includes the CCF entity 3. For example, the information about the target CCF entity includes information about a CCF entity 2 and a CCF entity 3, and the first CCF entity determines that the target CCF entity includes the CCF entity 2 and the CCF entity 3.

Manner 2.

The first CCF entity determines a to-be-shared API according to a third preset rule, and further, the first CCF entity determines a target CCF entity according to a fourth preset rule.

In an implementation, the first CCF entity obtains the to-be-shared API from locally stored APIs according to the third preset rule, and determines the target CCF entity of the to-be-shared API in the locally stored APIs according to the fourth preset rule. For example, information about a locally stored API may be information about an API that is stored by the first CCF entity after the first CCF entity receives the information about the API from the API publish entity. For example, the information about the API may be obtained by the first CCF entity from a third API publish request message of the API publish entity.

For example, the third preset rule may include determining the to-be-shared API based on a mapping relationship between commercial subscription information and a target CCF entity that is for publishing, or determining the to-be-shared API based on an API type or a mapping relationship between an API type and a target CCF entity that is for publishing. For a specific method for determining the to-be-shared API by the first CCF entity according to the third preset rule, refer to the description of determining the API publish range by the API publish entity according to the fifth preset rule in S401 in Embodiment 2. Details are not described herein again. Certainly, the first CCF entity may alternatively determine the to-be-shared API in another manner, for example, according to another preset rule. This is not limited in this embodiment of this application.

For example, the fourth preset rule may include determining the target CCF entity based on a mapping relationship between commercial subscription information and a target CCF entity that is for publishing, or determining the target CCF entity based on an API type or a mapping relationship between an API type and a target CCF entity that is for publishing. For a specific method for determining the target CCF entity by the first CCF entity according to the fourth preset rule, refer to the description of determining the API publish range by the API publish entity according to the fifth preset rule in S401 in Embodiment 2. Details are not described herein again. Certainly, the first CCF entity may alternatively determine the target CCF entity in another manner, for example, according to another preset rule. This is not limited in this embodiment of this application.

S502. The first CCF entity shares the information about the API with the target CCF entity.

In an implementation, the first CCF entity sends a second API publish request to the target CCF entity. The second API publish request includes the information about the API. For example, the second API publish request message may be a service API publish request, or a service API configuration request, or an interconnection API publish request.

In an implementation, if the first CCF entity determines to share the API with the second target CCF entity, the first CCF entity may modify information about the to-be-shared API into global information, and when sharing the information about the API with the second target CCF entity, the first CCF entity adds the global information of the API. For example, the first CCF entity modifies a local identifier of the API into a global identifier, and modifies a local interface address of the API into a global address.

In an implementation, if the first CCF entity determines to share the API with the second target CCF entity, the first CCF entity may perform topology hiding on the to-be-shared API, to be specific, select an AEF entity as a topology hiding entry point for each to-be-shared API, and replace interface information of the to-be-shared API with information about the topology hiding entry point, namely, the AEF entity.

S503. The target CCF entity receives the information about the API.

In an implementation, the target CCF entity receives the second API publish request. The second API publish request includes the information about the API, and the target CCF entity may store the received information about the API.

S504. The target CCF entity sends a second API publish response message to the first CCF entity.

In an implementation, the target CCF entity sends the second API publish response message to the first CCF entity. In an example, the second API publish response message may include publish result indication information, to indicate that the API is successfully published or the API is unsuccessfully published. For example, the API publish response message may be a service API publish response, or a service API configuration response, or an interconnection API publish response.

S505. The first CCF entity receives the second API publish response message.

It should be noted that in actual application, some steps may be deleted or some steps may be added in the foregoing embodiments as required, and a sequence of the steps is not limited in the embodiments of this application. In some implementations, steps of Embodiment 2 and Embodiment 3 may alternatively be combined. For example, if in S501 in Embodiment 3, the first CCF entity determines the to-be-shared API and the target CCF entity of the to-be-shared API in the manner 1, that is, based on the received first API publish request, steps in Embodiment 2 and Embodiment 3 may be combined. In this manner, the first CCF entity may send the first API publish response message to the API publish entity in S404, or S404 is not performed, and in S505, the first CCF entity sends the first API publish response message to the API publish entity after receiving the second API publish response message.

Further, after receiving the information about the API, each CCF entity may further send a notification message to an API invoking entity that subscribes to the API, to notify the API invoking entity that there is a new API or there is an API in which the API invoking entity is interested.

According to the API publish method provided in this embodiment of this application, the first CCF entity may determine to share the API with another CCF entity, so that the API is published to a plurality of CCF entities. In this way, the API invoking entity can discover and obtain the API by using the plurality of CCF entities.

Embodiment 4

Figure 5B:
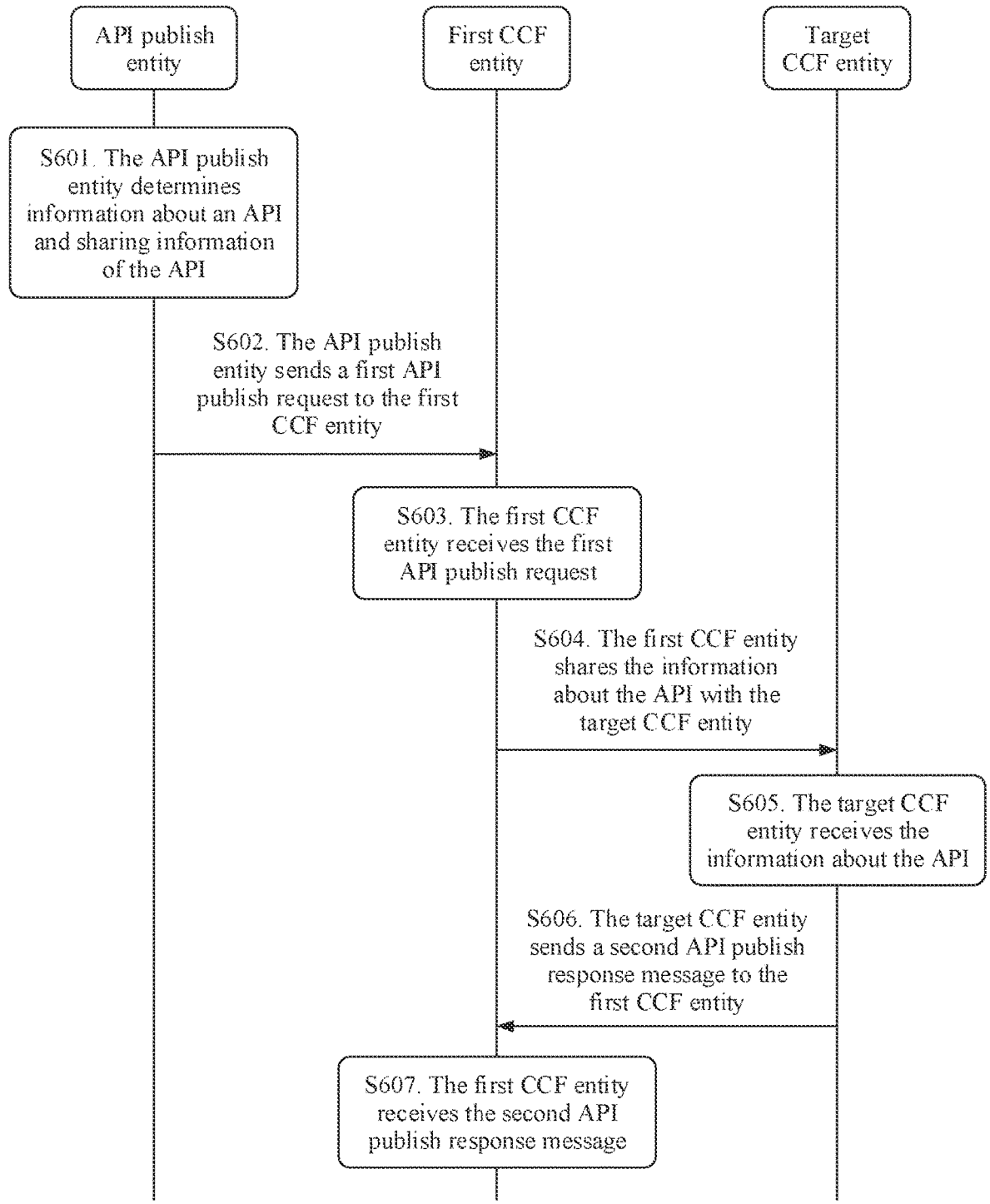
FIG. 5B is a schematic diagram 4 of an API publish method according to an embodiment of this application.

An embodiment of this application provides an API publish method. As shown in FIG. 5B, the method may include the following steps.

S601. An API publish entity determines information about an API and sharing information of the API.

The API publish entity determines the information about the API, where the API is a to-be-shared API, and determines the sharing information of the API.

The API publish entity may be an APF entity, or the API publish entity may be an APIMF entity. Certainly, the API publish entity may alternatively be another entity in a CAPIF system architecture. This is not limited in this embodiment of this application. In this embodiment of this application, an example in which the API publish entity is an APF entity is used for description.

The API publish entity may obtain the to-be-shared API and a target CCF entity of the to-be-shared API according to an instruction of a user. Alternatively, the to-be-shared API and the target CCF entity of the to-be-shared API may be determined according to a preset rule. For a specific method, refer to the description in S401, and details are not described herein again.

In an implementation, the API publish entity determines whether to share the API. If the API publish entity determines to share the API, the API publish entity determines the sharing information of the API. The sharing information of the API is used to indicate the first CCF entity to share the API.

In an implementation, the sharing information may include sharing range indication information, and the sharing range indication information is used to indicate a sharing range of the API. The sharing range of the API may include one or more CCF entities inside a domain to which the first CCF entity belongs, and/or CCF entities outside a domain to which the first CCF entity belongs. For example, a value of the sharing range indication information is 0, indicating that a sharing range of the API is one or more CCF entities inside the domain to which the first CCF entity belongs, a value of the sharing range indication information is 1, indicating that a sharing range of the API is one or more CCF entities outside the domain to which the first CCF entity belongs, or a value of the sharing range indication information is 2, indicating that a sharing range of the API includes one or more CCF entities inside the domain to which the first CCF entity belongs and one or more CCF entities outside the domain to which the first CCF entity belongs.

In an implementation, the sharing information may further include information about the target CCF entity, including information about the CCF entities inside the domain to which the first CCF entity belongs, and/or information about the CCF entities outside the domain to which the first CCF entity belongs. The information about the target CCF entity may be an identifier of the target CCF entity, an FQDN domain name, an IP address, an IP address and a port number, a URL, or the like.

When the sharing range indication information indicates that the sharing range of the API is the CCF entities inside the domain to which the first CCF entity belongs, the information about the target CCF entity includes information about the CCF entities inside the domain to which the first CCF entity belongs. When the sharing range indication information indicates that the sharing range of the API is the CCF entities outside the domain to which the first CCF entity belongs, the information about the target CCF entity includes information about the CCF entities outside the domain to which the first CCF entity belongs. When the sharing range indication information indicates that the sharing range of the API is the CCF entities inside the domain to which the first CCF entity belongs and the CCF entities outside the domain to which the first CCF entity belongs, the information about the target CCF entity includes information about the CCF entities inside the domain to which the first CCF entity belongs and information about the CCF entities outside the domain to which the first CCF entity belongs.

In an implementation, the sharing information may further include target domain indication information, the target domain indication information is used to indicate a target domain to which the target CCF entity belongs, and the target domain is different from the domain to which the first CCF entity belongs. The target domain indication information may be an identifier of the target domain, for example, a PLMN ID or a domain name (for example, domain.com). Alternatively, the target domain indication information may include an identifier of the target domain and information about the target CCF entity. The information about the target CCF entity may be an identifier of the target CCF entity, an FQDN domain name, an IP address, an IP address and a port number, a URL, or the like. The sharing range of the API is a sharing range of the API.

For example, in FIG. 1A and FIG. 1B, the trusted domain A is a PLMN network domain of the operator A, the CCF entity 1 is a CCF entity deployed in the Xi'an region by the operator A and is configured to manage an API provided by an AEF entity in the Xi'an region, and the CCF entity 2 is a CCF entity deployed in the Ningxia region by the operator A and is configured to manage an API provided by an AEF entity in the Ningxia region. The API publish entity 1 is the operator A in the Xi'an region, the API publish entity 2 is the operator A in the Ningxia region, and the trusted domain B is a PLMN network domain of the operator B. The API publish entity (the API publish entity 1) determines to publish the API 1 to the CCF entity 1. The API publish entity determines to share the API 2 to the Ningxia region, and in this case, determines to publish the API 2 to the CCF entity 1, and the CCF entity 1 publishes the API 2 to the CCF entity 2. The API publish entity determines to share the API 3 to the Ningxia region and the PLMN network domain of the operator B, and in this case, determines to publish the API 3 to the CCF entity 1, and the CCF entity 1 publishes the API 3 to the CCF entity 2 and the CCF entity 3. Then, the API publish entity 1 may determine not to specify sharing of the API 1, but specify that to-be-shared APIs include the API 2 and the API 3. In addition, the API publish entity 1 determines sharing information of the API 2 and the API 3.

In an implementation, the API publish entity (the API publish entity 1) determines that the sharing information is sharing range indication information. The sharing range indication information indicates that a sharing range of the API 2 is one or more CCF entities inside the domain (the trusted domain A) to which the first CCF entity (the CCF entity 1) belongs. In this case, the first CCF entity determines a target CCF entity for sharing the API 2, and the target CCF entity is the CCF entities inside the domain (the trusted domain A) to which the first CCF entity belongs. The sharing range indication information indicates that a sharing range of the API 3 is one or more CCF entities inside the domain (the trusted domain A) to which the first CCF entity (the CCF entity 1) belongs and CCF entities outside the domain (the trusted domain A) to which the first CCF entity (the CCF entity 1) belongs. In this case, the first CCF entity determines a target CCF entity for sharing the API 3, and the target CCF entity includes the CCF entities inside the domain (the trusted domain A) to which the first CCF entity (the CCF entity 1) belongs and the CCF entities outside the domain (the trusted domain A) to which the first CCF entity (the CCF entity 1) belongs.

In an implementation, the API publish entity (the API publish entity 1) determines that the sharing information is sharing range indication information and information about the target CCF entity. The API publish entity (the API publish entity 1) determines that sharing information corresponding to the API 2 includes sharing range indication information, indicating that a sharing range of the API 2 is one or more CCF entities inside the domain (the trusted domain A) to which the first CCF entity (the CCF entity 1) belongs, and the information about the target CCF entity includes information about the CCF entity 2. The API publish entity (the API publish entity 1) determines that sharing information corresponding to the API 3 includes sharing range indication information, indicating that a sharing range of the API 3 is one or more CCF entities inside the domain (the trusted domain A) to which the first CCF entity (the CCF entity 1) belongs and CCF entities outside the domain (the trusted domain A) to which the first CCF entity (the CCF entity 1) belongs, and the information about the target CCF entity includes information about the CCF entity 2 and information about the CCF entity 3.

In an implementation, the API publish entity (the API publish entity 1) determines that the sharing information includes target domain indication information. For example, the API publish entity (the API publish entity 1) determines that sharing information corresponding to the API 3 includes sharing range indication information, indicating that a sharing range of the API 3 is one or more CCF entities inside the domain (the trusted domain A) to which the first CCF entity (the CCF entity 1) belongs and CCF entities outside the domain (the trusted domain A) to which the first CCF entity (the CCF entity 1) belongs, and the information about the target CCF entity includes information about the CCF entity 2, and the target domain indication information includes information about the trusted domain B.

S602. The API publish entity sends a first API publish request to the first CCF entity.

The API publish entity sends the first API publish request to the first CCF entity. The first API publish request includes the information about the API and the sharing information of the API. For detailed description, refer to S402, and details are not described herein again.

S603. The first CCF entity receives the first API publish request.

The first CCF entity receives the first API publish request. The first API publish request includes the information about the API and the sharing information of the API.

The first CCF entity determines the to-be-shared API based on the information about the API, and determines that an API indicated by the information about the API in the first API publish request is the to-be-shared API. For example, if the information about the API includes the information about the API 2 and the information about the API 3, the first CCF entity determines that the to-be-shared API includes the API 2 and the API 3.

The first CCF entity determines the target CCF entity of the to-be-shared API based on the sharing information of the API. The target CCF entity may include a first target CCF entity and/or a second target CCF entity, a domain to which the first target CCF entity belongs is the same as the domain to which the first CCF entity belongs, and a domain to which the second target CCF entity belongs is different from the domain to which the first CCF entity belongs.

In an implementation, the sharing information is sharing range indication information, the sharing range indication information indicates a sharing range of the API, and the sharing range of the API includes one or more CCF entities inside the domain to which the first CCF entity belongs and/or one or more CCF entities outside the domain to which the first CCF entity belongs. The first CCF entity determines the sharing range of the API according to the sharing range indication information. If the sharing range is one or more CCF entities inside the domain to which the first CCF entity belongs, the first CCF entity determines the target CCF entity in the CCF entities inside the domain to which the first CCF entity belongs. Alternatively, if the sharing range is one or more CCF entities outside the domain to which the first CCF entity belongs, the first CCF entity determines the target CCF entity in the CCF entities outside the domain to which the first CCF entity belongs. Alternatively, if the sharing range includes one or more CCF entities inside the domain to which the first CCF entity belongs and one or more CCF entities outside the domain to which the first CCF entity belongs, the first CCF entity determines the first target CCF entity in the CCF entities inside the domain to which the first CCF entity belongs, and determines the second target CCF entity in the CCF entities outside the domain to which the first CCF entity belongs, and the target CCF entity includes the first target CCF entity and the second target CCF entity.

In some examples, if the sharing range of the to-be-shared API is one or more CCF entities inside the domain to which the first CCF entity belongs, the first CCF entity determines, according to a seventh preset rule, the target CCF entity in the CCF entities inside the domain to which the first CCF entity belongs. The target CCF entity is the first target CCF entity. In some examples, if the sharing range of the to-be-shared API is one or more CCF entities outside the domain to which the first CCF entity belongs, the first CCF entity determines, according to an eighth preset rule, the target CCF entity in the CCF entities outside the domain to which the first CCF entity belongs. The target CCF entity is the second target CCF entity. In some examples, if the sharing range of the to-be-shared API includes one or more CCF entities inside the domain to which the first CCF entity belongs and one or more CCF entities outside the domain to which the first CCF entity belongs, the first CCF entity determines, according to a seventh preset rule, the first target CCF entity in the CCF entities inside the domain to which the first CCF entity belongs, and determines, according to an eighth preset rule, the second target CCF entity in the CCF entities outside the domain to which the first CCF entity belongs.

For example, the first CCF entity (the CCF entity 1) receives the first API publish request from the API publish entity (the API publish entity 1). The first API publish request includes information about the API 2 and corresponding sharing range indication information, and a value of the sharing range indication information is 0, indicating that a sharing range of the API 2 is one or more CCF entities inside the domain (the trusted domain A) to which the first CCF entity belongs. The first CCF entity (the CCF entity 1) determines the target CCF entity in the trusted domain A according to the seventh preset rule. In an example, the seventh preset rule is that the target CCF entity includes all CCF entities inside the domain (trusted domain A) to which the first CCF entity belongs. In this case, the first CCF entity determines that the target CCF entity includes the CCF entity 2. In an example, the seventh preset rule is a mapping relationship between commercial subscription information and a target CCF entity that is for publishing (which may also be understood as a mapping relationship between an API type and a domain of a target CCF entity), an API type, a mapping relationship between an API type and a target CCF entity that is for publishing (which may also be understood as a mapping relationship between an API type and a logical domain or a geographic region of a target CCF entity), or the like. For example, the seventh preset rule may be sharing an API of an IoT type with the CCF entity 2. In this case, when the API 2 is an API of the IoT type, the first CCF entity (the CCF entity 1) determines to share the API 2 with the CCF entity 2, that is, the target CCF entity includes the CCF entity 2. Certainly, the first CCF entity may alternatively determine the target CCF entity in another manner, for example, according to another preset rule. This is not limited in this embodiment of this application.

For example, the first API publish request further includes information about the API 3 and corresponding sharing range indication information, and a value of the sharing range indication information is 2, indicating that a sharing range of the API 3 includes one or more CCF entities inside the domain to which the first CCF entity belongs and one or more CCF entities outside the domain to which the first CCF entity belongs. The first CCF entity determines, according to the seventh preset rule, the first target CCF entity inside the domain to which the first CCF entity belongs, and determines, according to the eighth preset rule, the second target CCF entity outside the domain to which the first CCF entity belongs. In an example, the eighth preset rule includes a mapping relationship between commercial subscription information and a target CCF entity that is for publishing (which may also be understood as a mapping relationship between an API type and a domain of a target CCF entity), an API type, a mapping relationship between an API type and a target CCF entity that is for publishing (which may also be understood as a mapping relationship between an API type and a logical domain or a geographic region of a target CCF entity), or the like. For example, an operator B and an operator A have a subscription for sharing an API for use. To be specific, the operator B can obtain and use any API of the operator A. The first CCF entity (the CCF entity 1) determines, based on subscription information for sharing an API for use between the operator A and the operator B, to publish the API to a trusted domain (for example, a domain corresponding to the CCF entity 3 in FIG. 1A and FIG. 1B) corresponding to the operator B. For example, the eighth preset rule may be sharing an API of a V2X type to the CCF entity 3. In this case, when the API 3 is an API of the V2X type, the first CCF entity (the CCF entity 1) determines to share the API 3 with the CCF entity 3. Certainly, the first CCF entity may alternatively determine the second target CCF entity in another manner, for example, according to another preset rule. This is not limited in this embodiment of this application.

It should be noted that the seventh preset rule and the eighth preset rule may be rules corresponding to each other. For example, the seventh preset rule is determining a target CCF entity based on an API type, and the eighth preset rule is determining a target CCF entity based on the API type. The seventh preset rule and the eighth preset rule may alternatively be corresponding rules not corresponding to each other. For example, the seventh preset rule is determining a target CCF entity based on an API type, and the eighth preset rule is determining a target CCF entity based on a mapping relationship between commercial subscription information and a target CCF entity that is for publishing. This is not limited in this embodiment of this application.

In an implementation, the sharing information includes sharing range indication information and information about the target CCF entity.

In an example, the sharing range indication information indicates that a sharing range of the API is one or more CCF entities inside the domain to which the first CCF entity belongs, the first CCF entity determines, as the target CCF entity, a CCF entity indicated by the information about the target CCF entity, and the target CCF entity is the CCF entity inside the domain to which the first CCF entity belongs. For example, sharing information corresponding to the API 2 includes sharing range indication information, indicating that a sharing range of the API 2 is one or more CCF entities inside the domain (the trusted domain A) to which the first CCF entity (the CCF entity 1) belongs, information about the target CCF entity includes information about the CCF entity 2, and the first CCF entity determines the CCF entity 2 as the target CCF entity.

In an example, the sharing range indication information indicates that a sharing range of the API is one or more CCF entities outside the domain to which the first CCF entity belongs, the first CCF entity determines, as the target CCF entity, a CCF entity indicated by the information about the target CCF entity, and the target CCF entity is the CCF entity outside the domain to which the first CCF entity belongs. For example, sharing information corresponding to an API 4 includes sharing range indication information, indicating that a sharing range of the API 4 is one or more CCF entities outside the domain (the trusted domain A) to which the first CCF entity (the CCF entity 1) belongs, the information about the target CCF entity includes information about the CCF entity 3, and the first CCF entity determines the CCF entity 3 as the target CCF entity.

In an example, the sharing range indication information indicates that a sharing range of the API is one or more CCF entities inside the domain to which the first CCF entity belongs and CCF entities outside the domain to which the first CCF entity belongs, the first CCF entity determines, as the target CCF entity, a CCF entity indicated by the information about the target CCF entity, and the target CCF entity includes the CCF entity inside the domain to which the first CCF entity belongs and the CCF entity outside the domain to which the first CCF entity belongs. For example, sharing information corresponding to the API 3 includes sharing range indication information, indicating that a sharing range of the API 3 is one or more CCF entities inside the domain (the trusted domain A) to which the first CCF entity (the CCF entity 1) belongs and CCF entities outside the domain (the trusted domain A) to which the first CCF entity (the CCF entity 1) belongs, the information about the target CCF entity includes information about the CCF entity 2 and information about the CCF entity 3, the first CCF entity determines the CCF entity 2 as the first target CCF entity, determines the CCF entity 3 as the second target CCF entity, and the target CCF entity includes the first target CCF entity and the second target CCF entity.

In an implementation, the sharing information further includes target domain indication information, and the target domain indication information is used to indicate a target domain to which the target CCF entity belongs. The first CCF entity determines the second target CCF entity in one or more CCF entities inside the target domain.

For example, the target domain indication information is an identifier of the target domain, and the first CCF entity determines the second target CCF entity in the target domain according to a second preset rule. For example, the second preset rule is that the target CCF entity is a domain-bound CCF entity in the target domain. For example, the target domain indication information is an identifier of the trusted domain B in FIG. 1A and FIG. 1B, a domain-bound CCF entity in the trusted domain B is the CCF entity 3, and the first CCF entity determines that the second target CCF entity includes the CCF entity 3. For another example, the target domain indication information includes an identifier of the target domain and inter-domain target CCF entity information, and the first CCF entity determines the second target CCF entity in the target domain based on the inter-domain target CCF entity information. For example, the identifier of the target domain is an identifier of the trusted domain B in FIG. 1A and FIG. 1B, the inter-domain target CCF entity information includes information about the CCF entity 3, and the first CCF entity determines that the second target CCF entity includes the CCF entity 3 in the trusted domain B.

It should be noted that information about the CCF entity outside the domain to which the first CCF entity belongs may be indicated by the information about the target CCF entity that is in the sharing information, or may be indicated by the target domain indication information in the sharing information. This is not limited in this embodiment of this application.

S604. The first CCF entity shares the information about the API with the target CCF entity.

For the method of sharing, by the first CCF entity, the information about the API with the target CCF entity, refer to the description in S502, and details are not described herein again.

S605. The target CCF entity receives the information about the API.

For an operation step after the target CCF entity receives the information about the API, refer to the description in S503, and details are not described herein again.

S606. The target CCF entity sends a second API publish response message to the first CCF entity.

For the method of sending, by the target CCF entity, the second API publish response message to the first CCF entity, refer to the description in S504, and details are not described herein again.

S607. The first CCF entity receives the second API publish response message.

It should be noted that in actual application, some steps may be deleted or some steps may be added in the foregoing embodiments as required, and a sequence of the steps is not limited in this embodiment of this application.

Further, after receiving the information about the API, each CCF entity may further send a notification message to an API invoking entity that subscribes to the API, to notify the API invoking entity that there is a new API or there is an API in which the API invoking entity is interested.

According to the API publish method provided in this embodiment of this application, the first CCF entity may determine, according to indication information of the API publish entity, to share the API with another CCF entity, so that the API is published to a plurality of CCF entities. In this way, the API invoking entity can discover and obtain the API by using the plurality of CCF entities.

The foregoing mainly describes the solutions provided in the embodiments of this application from a perspective of interaction between the API publish entity and the CCF entity. It may be understood that to implement the foregoing functions, the API publish entity and the CCF entity include corresponding hardware structures and/or software modules for performing the functions. A person skilled in the art should be easily aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the API publish entity and the CCF entity based on the foregoing method examples. For example, function modules may be divided corresponding to functions, or two or more functions may be integrated into one processing module. The integrated module may be implemented in a form of hardware, or may be implemented in a form of a software function module. It should be noted that, in the embodiments of this application, module division is an example, and is merely a logical function division. In actual implementation, another division manner may be used. A description is made below by using an example in which function modules are divided corresponding to functions.

Figure 6:
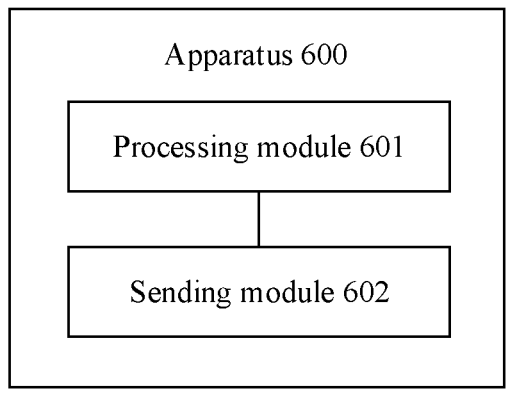
FIG. 6 is a schematic structural diagram 1 of a communications apparatus according to an embodiment of this application.

FIG. 6 is a schematic structural diagram of an apparatus 600 according to an embodiment of this application. The apparatus 600 may be a CCF entity, and can implement a function of the first CCF entity in the methods provided in the embodiments of this application. Alternatively, the apparatus 600 may be an apparatus that can support a CCF entity in implementing a function of the first CCF entity in the methods provided in the embodiments of this application. The apparatus 600 may be a hardware structure, a software module, or a combination of a hardware structure and a software module. The apparatus 600 may be implemented by a chip system. In this embodiment of this application, the chip system may include a chip, or may include a chip and another discrete component. As shown in FIG. 6, the apparatus 600 includes a processing module 601 and a sending module 602.

The processing module 601 is configured to determine a to-be-shared API.

The sending module 602 is configured to share information about the to-be-shared API with a target CCF entity of the to-be-shared API.

Figure 7:
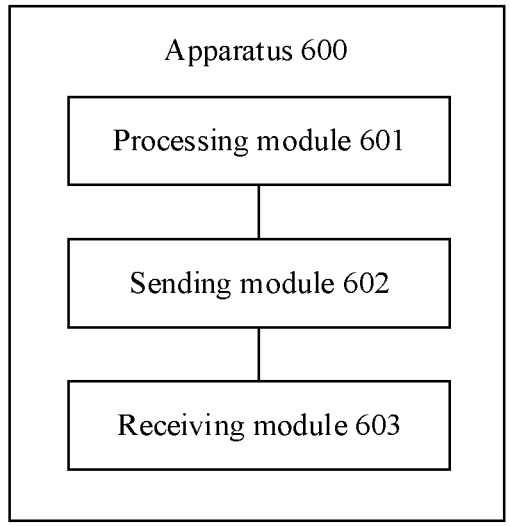
FIG. 7 is a schematic structural diagram 2 of a communications apparatus according to an embodiment of this application.

In an implementation, as shown in FIG. 7, the apparatus 600 further includes a receiving module 603.

The receiving module 603 is configured to receive a first API publish request. The first API publish request includes information about an API and sharing information of the API.

The processing module 601 is specifically configured to determine the to-be-shared API based on the first API publish request.

In an implementation, the processing module 601 is further configured to determine the target CCF entity based on the sharing information.

In an implementation, the sharing information includes the at least one of sharing indication information, information about the target CCF entity, or target domain indication information, and the sharing indication information is used to indicate that the API is to be shared, the target domain indication information is used to indicate a target domain, and the target domain is different from a domain to which the first CCF entity belongs.

In an implementation, if the sharing information includes sharing indication information, the processing module 601 is configured to determine the target CCF entity according to a first preset rule, or if the sharing information includes information about the target CCF entity, the processing module 601 is configured to determine the target CCF entity based on the information about the target CCF entity, or if the sharing information includes the target domain indication information, the processing module 601 is configured to determine a second target CCF entity based on the target domain indication information. The second target CCF entity is one or more CCF entities in the target CCF entity, and a domain to which the second target CCF entity belongs is different from the domain to which the first CCF entity belongs.

In an implementation, the sharing information includes sharing range indication information, and the sharing range indication information is used to indicate a sharing range of the API.

In an implementation, if the sharing range of the API is one or more CCF entities inside a domain to which the first CCF entity belongs, the processing module 601 is configured to determine the target CCF entity in the CCF entities inside the domain to which the first CCF entity belongs.

In another implementation, if the sharing range of the API is one or more CCF entities outside a domain to which the first CCF entity belongs, the processing module 601 is configured to determine the target CCF entity in the CCF entities outside the domain to which the first CCF entity belongs.

In another implementation, if the sharing range of the API includes one or more CCF entities inside a domain to which the first CCF entity belongs and one or more CCF entities outside the domain to which the first CCF entity belongs, the processing module 601 is configured to determine a first target CCF entity in the CCF entities inside the domain to which the first CCF entity belongs, and determine a second target CCF entity in the CCF entities outside the domain to which the first CCF entity belongs, where the target CCF entity includes the first target CCF entity and the second target CCF entity.

The first target CCF entity is one or more CCF entities in the target CCF entity, and a domain to which the first target CCF entity belongs is the same as the domain to which the first CCF entity belongs. The second target CCF entity is one or more CCF entities in the target CCF entity, and a domain to which the second target CCF entity belongs is different from the domain to which the first CCF entity belongs.

In an implementation, the sharing information further includes target domain indication information, and the target domain indication information is used to indicate a target domain to which the target CCF entity belongs.

In an implementation, determining, by the processing module 601, the target CCF entity in the CCF entities outside the domain to which the first CCF entity belongs specifically includes determining, by the processing module 601, the target CCF entity in one or more CCF entities inside the target domain.

In another implementation, determining, by the processing module 601, a second target CCF entity in the CCF entities outside the domain to which the first CCF entity belongs specifically includes determining, by the processing module 601, the second target CCF entity in one or more CCF entities inside the target domain.

In an implementation, if the target domain indication information is an identifier of the target domain, the processing module 601 is specifically configured to determine the second target CCF entity in the target domain according to a second preset rule, or if the target domain indication information includes an identifier of the target domain and inter-domain target CCF entity information, the processing module 601 is specifically configured to determine the second target CCF entity in the target domain based on the inter-domain target CCF entity information.

In an implementation, the processing module 601 is specifically configured to determine the to-be-shared API according to a third preset rule.

In an implementation, the processing module 601 is specifically configured to determine the target CCF entity according to a fourth preset rule.

In an implementation, the target CCF entity includes a first target CCF entity and/or a second target CCF entity. A domain to which the first target CCF entity belongs is the same as the domain to which the first CCF entity belongs, and a domain to which the second target CCF entity belongs is different from the domain to which the first CCF entity belongs.

In an implementation, sharing, by the sending module 602, information about the to-be-shared API with a target CCF entity of the to-be-shared API specifically includes sharing, by the sending module 602, the information about the to-be-shared API with the second target CCF entity, where the information about the to-be-shared API is global information.

In an implementation, the information about the to-be-shared API includes interface information of the to-be-shared API, and the interface information is information about a topology hidden entry point.

It should be noted that, all related content of the steps provided in the foregoing method embodiments may be cited in function descriptions of corresponding function modules. For example, the processing module 601 may be configured to perform at least S301 in FIG. 3, S501 in FIG. 5A, or S603 in FIG. 5B, and/or perform another step described in this application. The sending module 602 may be configured to perform at least S302 in FIG. 3, S404 in FIG. 4, S502 in FIG. 5A, or S604 in FIG. 5B, and/or perform another step described in this application. The receiving module 603 may be configured to perform at least one S403 in FIG. 4, S505 in FIG. 5A, or S603 and S607 in FIG. 5B, and/or perform another step described in this application. Details are not described herein again.

Figure 8:
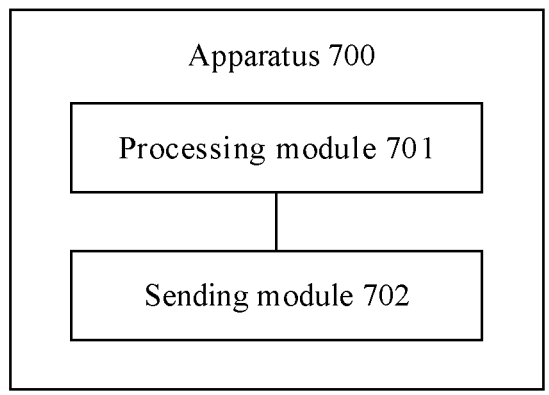
FIG. 8 is a schematic structural diagram 3 of a communications apparatus according to an embodiment of this application.

FIG. 8 is a schematic structural diagram of an apparatus 700 according to an embodiment of this application. The apparatus 700 may be an API publish entity, and can implement a function of the API publish entity in the methods provided in the embodiments of this application. The apparatus 700 may alternatively be an apparatus that can support an API publish entity in implementing a function of the API publish entity in the methods provided in the embodiments of this application. The apparatus 700 may be a hardware structure, a software module, or a combination of a hardware structure and a software module. As shown in FIG. 8, the apparatus 700 includes a processing module 701 and a sending module 702.

The processing module 701 is configured to determine information about an API and sharing information of the API. The sharing information is used to indicate to a first CCF entity to share the API.

The sending module 702 is configured to send a first API publish request to the first CCF entity. The first API publish request includes the information about the API and the sharing information of the API.

In an implementation, the sharing information includes at least one of sharing indication information, information about a target CCF entity, or target domain indication information, and the sharing indication information is used to indicate that the API is to be shared, the target domain indication information is used to indicate a target domain, and the target domain is different from a domain to which the first CCF entity belongs.

In an implementation, the sharing information includes sharing range indication information, and the sharing range indication information is used to indicate a sharing range of the API.

In an implementation, the sharing information further includes target domain indication information, and the target domain indication information is used to indicate a target domain to which the target CCF entity belongs.

In an implementation, the target domain indication information is an identifier of the target domain, or the target domain indication information includes an identifier of the target domain and inter-domain target CCF entity information, and the inter-domain target CCF entity information is used to indicate information about the target CCF entity of the to-be-shared API in the target domain.

It should be noted that all related content of the steps in the foregoing method embodiments may be cited in function descriptions of corresponding function modules. For example, the processing module 701 may be configured to perform at least S401 in FIG. 4, or S601 in FIG. 5B, and/or perform another step described in this application. The sending module 702 The sending module 702 may be configured to perform at least S402 in FIG. 4, S602 in FIG. 5B, and/or perform other steps described in this application. Details are not described herein again.

In the application, the apparatus 600 or the apparatus 700 may be presented in a form of integrating each function module in the apparatus. The "module" herein may be a specific ASIC, a circuit, a processor executing one or more software or firmware programs, a storage device, an integrated logic circuit, and/or another device that can provide the foregoing functions.

In a simple embodiment, the apparatus 600 or the apparatus 700 may use a form shown in FIG. 2.

In an example of this application, the processing module 601 in FIG. 6 or FIG. 7 or the processing module 701 in FIG. 8 may be implemented by using the processor 201 or the processor 208, the sending module 602 in FIG. 6 or FIG. 7, the receiving module 603 in FIG. 7, or the sending module 702 in FIG. 8 may be implemented by using the communications interface 204.

The apparatus provided in the embodiments of this application may be applied to the foregoing API publish method. Therefore, for technical effects that can be obtained by the apparatus, refer to the foregoing method embodiments. Details are not described herein again.

A person of ordinary skill in the art may understand that all or some of the steps of the foregoing methods may be implemented by a program instructing related hardware. The program may be stored in a computer-readable storage medium. The computer-readable storage medium includes a ROM, a RAM, an optical disc, and the like.

An embodiment of this application further provides a storage medium. The storage medium may include a memory 203.

For explanations and beneficial effects of related content in any apparatus provided above, refer to the corresponding method embodiments provided in the foregoing description. Details are not described herein again.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, a network device, a user device, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that these modifications and variations fall within the scope of the claims of this application and their equivalent technologies.

What is claimed is:

1. An application programming interface (API) publish method comprising:
   sending, by an API publish entity to a first common API core function (CCF) entity, an API publish request comprising first information about an API and sharing information of the API, wherein the sharing information comprises at least one of sharing indication information indicating that the API is to be shared or target domain indication information indicating a target domain different from a domain to which the first CCF entity belongs;
   receiving, by the first CCF entity, the API publish request;
   determining, by the first CCF entity, a to-be-shared API based on the API publish request; and
   sharing, by the first CCF entity, second information about the to-be-shared API with a second CCF entity of the to-be-shared API.

2. The API publish method of claim 1, wherein determining the to-be shared API comprises determining that the API is the to-be-shared API when the API publish request comprises the sharing information.

3. The API method of claim 1, wherein the first information comprises an API identifier of the API, an API type of the API, or interface information of the API.

4. The API publish method of claim 1, further comprising determining, by the first CCF entity, the second CCF entity based on the sharing information.

5. The API publish method of claim 4, wherein the sharing information comprises sharing range indication information indicating a sharing range of the API.

6. The API publish method of claim 1, wherein the second information comprises an API identifier of the to-be-shared API, an API type of the to-be-shared API, or interface information of the to-be-shared API.

7. The API publish method of claim 1, further comprising determining, by the API publish entity, the first information and the sharing information.

8. An application programming interface (API) publish system comprising:
   an API publish entity configured to send an API publish request comprising first information about an API and sharing information of the API; and
   a first common API framework core function (CCF) entity configured to:
   receive the API publish request from the API publish entity, wherein the sharing information comprises at least one of sharing indication information indicating that the API is to be shared or target domain indication information indicating a target domain different from a domain to which the first CCF entity belongs;
   determine a to-be-shared API based on the API publish request; and
   share second information about the to-be-shared API with a second CCF entity of the to-be-shared API.

9. The API publish system of claim 8, wherein the first CCF entity is further configured to determine that the API is the to-be-shared API when the first API publish request comprises the sharing information.

10. The API publish system of claim 8, wherein the first information comprises an API identifier of the API, an API type of the API, or interface information of the API.

11. The API publish system of claim 8, wherein the first CCF entity is further configured to determine the second CCF entity based on the sharing information.

12. The API publish system of claim 8, wherein the second information comprises an API identifier of the to-be-shared API, an API type of the to-be-shared API, or interface information of the to-be-shared API.

13. The API publish system of claim 8, wherein the API publish entity is further configured to determine the first information and the sharing information.

14. A communications apparatus, comprising:
   a processor; and
   a memory coupled to the processor and configured to store instructions that, when executed by the processor, cause the communications apparatus to be configured to:
   receive, from an application programming interface (API) publish entity, an API publish request comprising first information about an API and sharing information of the API, wherein the sharing information comprises at least one of sharing indication information indicating that the API is to be shared or target domain indication information indicating a target domain different from a domain to which the communications apparatus belongs;
   determine a to-be-shared API based on the API publish request; and
   share second information about the to-be-shared API with a target common API core function (CCF) entity of the to-be-shared API.

15. The communications apparatus of claim 14, wherein the instructions further cause the communications apparatus to be configured to determine that the API is the to-be-shared API when the first API publish request comprises the sharing information.

16. The communications apparatus of claim 14, wherein the first information comprises an API identifier of the API, an API type of the API, or interface information of the API.

17. The communications apparatus of claim 14, wherein the instructions further cause the communications apparatus to be configured to determine the target CCF entity based on the sharing information.

18. An application programming interface (API) publish method comprising:
   receiving, by a first common API core function (CCF) entity from an API publish entity, an API publish request comprising first information about an API and sharing information of the API, wherein the sharing information comprises at least one of sharing indication information indicating that the API is to be shared or target domain indication information indicating a target domain different from a domain to which the first CCF entity belongs;
   determining, by the first CCF entity, a to-be-shared API based on the API publish request; and sharing, by the first CCF entity, second information about the to-be-shared API with a second CCF entity of the to-be-shared API.

19. The API publish method of claim 18, wherein determining the to-be-shared API comprises determining that the API is the to-be-shared API when the API publish request comprises the sharing information.

20. The API publish method of claim 18, wherein the first information comprises an API identifier of the API, an API type of the API, or interface information of the API.

21. The API publish method of claim 18, further comprising determining, by the first CCF entity, the second CCF entity based on the sharing information.

22. The API publish method of claim 21, wherein the sharing information comprises sharing range indication information indicating a sharing range of the API.

23. The API publish method of claim 18, wherein the second information comprises an API identifier of the to-be-shared API, an API type of the to-be-shared API, or interface information of the to-be-shared API.

* * * * *